(12) United States Patent
Mitra

(10) Patent No.: US 10,936,296 B2
(45) Date of Patent: Mar. 2, 2021

(54) AUTOMATED APPLICATION UPDATES DURING OPERATING SYSTEM UPGRADES

(71) Applicant: MICROSOFT TECHNOLOGY LICENSING, LLC, Redmond, WA (US)

(72) Inventor: Sarjana Sheth Mitra, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/405,431

(22) Filed: May 7, 2019

(65) Prior Publication Data

US 2020/0356354 A1 Nov. 12, 2020

(51) Int. Cl.
| | | |
|---|---|---|
| *G06F 8/65* | (2018.01) | |
| *G06F 16/903* | (2019.01) | |
| *G06F 8/36* | (2018.01) | |

(52) U.S. Cl.
CPC .................. *G06F 8/65* (2013.01); *G06F 8/36* (2013.01); *G06F 16/903* (2019.01)

(58) Field of Classification Search
CPC ................................ G06F 8/65; G06F 16/903
USPC .................................................. 717/168–178
See application file for complete search history.

(56) References Cited

U.S. PATENT DOCUMENTS

| | | | |
|---|---|---|---|
| 7,047,527 B1 * | 5/2006 | Lin ........................... | G06F 8/65 717/122 |
| 7,624,393 B2 | 11/2009 | Egan et al. | |
| 7,818,736 B2 * | 10/2010 | Appavoo ................ | G06F 8/656 717/168 |
| 8,261,258 B1 | 9/2012 | Jianu et al. | |
| 8,990,793 B1 * | 3/2015 | Fong-Jones ............... | G06F 8/61 717/168 |
| 2011/0214021 A1 | 9/2011 | Vidal et al. | |
| 2014/0380292 A1 | 12/2014 | Ru et al. | |
| 2017/0322794 A1 * | 11/2017 | Ferlitsch ................. | H04L 67/10 |
| 2018/0219972 A1 * | 8/2018 | Vintzel .................... | H04L 67/42 |
| 2018/0239894 A1 | 8/2018 | Mitra et al. | |

OTHER PUBLICATIONS

Giuffrida, Cristiano, Anton Kuijsten, and Andrew S. Tanenbaum. "Safe and automatic live update for operating systems." ACM Sigplan Notices 48.4 (2013): pp. 279-292. (Year: 2013).*
Hicks, Michael, and Scott Nettles. "Dynamic software updating." ACM Transactions on Programming Languages and Systems (TOPLAS) 27.6 (2005): pp. 1049-1096. (Year: 2005).*

(Continued)

*Primary Examiner* — Satish Rampuria
(74) *Attorney, Agent, or Firm* — Watson Patents, PLC; Vladan M. Vasiljevic

(57) ABSTRACT

A system and method for providing automated software updates during an upgrade of an operating system for a computing device. When a computing device is scheduled to undergo an operating system upgrade event, users typically must follow up to ensure software stored on the device is also compatible with the new operating system configuration. The disclosed systems provide a mechanism by which a cloud-based service manages a fully automated software update process for the user that will occur concurrently with the operating system upgrade event.

20 Claims, 16 Drawing Sheets

(56) References Cited

OTHER PUBLICATIONS

Xing, Luyi, et al. "Upgrading your android, elevating my malware: Privilege escalation through mobile os updating." 2014 IEEE Symposium on Security and Privacy. IEEE, 2014. pp. 393-408 (Year: 2014).*

Seto, D., et al. "Dynamic control system upgrade using the simplex architecture." IEEE Control Systems Magazine 18.4 (1998): pp. 72-80. (Year: 1998).*

Bruzzone, Pierluigi, et al. "Upgrade of operating range for SULTAN test facility." IEEE transactions on applied superconductivity 12.1 (2002): pp. 520-523. (Year: 2002).*

Katihar, Ekansh, Ferhat Khendek, and Maria Toeroe. "Operating system upgrade in high availability environment." 2013 21st International Conference on Software, Telecommunications and Computer Networks—(SoftCOM 2013). IEEE, 2013.pp. 1-5 (Year: 2013).*

Czechowski, et al., "Create a task sequence to upgrade an OS in Configuration Manager", Retrieved from: https://docs.microsoft.com/en-us/sccm/osd/deploy-use/create-a-task-sequence-to-upgrade-an-operating-system, 8 Pages.

Gern, S, "A closer look at MSIX", Retrieved from: https://blogs.msdn.microsoft.com/sgern/2018/06/18/a-closer-look-at-msix/, Jun. 18, 2018, 4 Pages.

Mackie, Kurt, "Microsoft Replacing MSI, AppX with New Packaging Tool", Retrieved from: https://mcpmag.com/articles/2018/08/09/microsoft-msix-replacing-msi-appx.aspx, Aug. 9, 2018, 6 Pages.

Ross, et al., "Automatically update multiple apps at the same time using Microsoft Application Virtualization Sequencer (App-V Sequencer)", Retrieved from: https://docs.microsoft.com/en-us/windows/application-management/app-v/appv-auto-batch-updating, Apr. 18, 2018, 6 Pages.

Samat, Sameer, "Android 7.0 Nougat: a more powerful OS, made for you", Retrieved from: https://blog.google/products/android/android-70-nougat-more-powerful-os-made/, Aug. 22, 2016, 6 Pages.

"International Search Report and Written Opinion Issued in PCT Application No. PCT/US20/026944", dated Jul. 17, 2020, 12 Pages.

\* cited by examiner

AUTOMATED APPLICATION UPDATES DURING OPERATING SYSTEM UPGRADES

BACKGROUND

To perform computing tasks, computer systems run software. Software is continually evolving to include updated functionality, for example, to correct bugs, address security issues, add features, and simply to provide additional or enhanced features. At different times, a software developer can release updates to their software that include updated functionality and tools. Computing device end-users can install updates at their computer system to add updated functionality to their software.

Different software development groups can own and have responsibly for maintaining different management software applications. As such, the timing of releasing updates for different management software applications can vary. Some development groups can release updates on a schedule and others can release updates on an ad hoc basis. Even when updates are released on a schedule, different development groups can have different schedules. In addition, software applications can be configured to operate in computing devices that are associated with a particular operating system configuration or version. Thus, when these configurations change, the software relied on by the end-user can abruptly become out-of-date.

Installing a software update typically requires an end-user to make user of or more updaters that can make use of network connectivity to determine when updates are available. Some updaters automatically alert users when updates are available. Other updaters can assist users in determining whether updates are available when so desired. When an update is made available, the user can select the update and the updater can help the user install the update for the user. Similarly, updates in cloud computing environments are typically performed manually. An administrator can identify a number of updates to install, manually formulate an installation plan (e.g., how to take down and bring up systems, determine a specified order for installing updates, etc.), and then install updates in accordance with the installation plan (e.g., take down and bring up systems, install updates in the specified order, etc.). However, since management software applications have to interoperate but are often developed by different groups, updates to one management software application can cause another management software application to operate in an unintended manner.

Based on the number of management software applications and the number of updates and applied fixes for each management software application, a very large number of different combinations are possible. As users attempt to keep abreast of the updates along with regular operating system upgrades, they may struggle with recurring operational challenges that are both time-consuming and inefficient. Thus, there remain significant areas for new and improved ideas for updating software in a way that reducing the burden on end-users and network administrators, as well as provides users with tools for the improved management of device operations.

SUMMARY

An automated remediation and restoration system, in accord with a first aspect of this disclosure, includes a processor and computer readable media including instructions which, when executed by the processor, cause the processor to verify, at a remote cloud service, that an operating system of the computing device is scheduled for upgrade from a first configuration to a second configuration via a first upgrade package during an upcoming first upgrade event, as well as determine that an initial version of a first software component currently stored on the computing device is incompatible with the second configuration. In addition, the instructions cause the processor to submit a first update query to an online software repository regarding the first software component, and receive, from the online software repository, a first status indicating that a first content is available to update the first software component from the initial version to an updated version, wherein the updated version is compatible with the second configuration. Furthermore, the instructions also cause the processor to selectively download the first content from the online software repository to the computing device during the first upgrade event, and automatically update the first software component from the initial version to the updated version during the first upgrade event.

A method, in accord with a second aspect of this disclosure, includes verifying, at a remote cloud service, that an operating system of the computing device is scheduled for upgrade from a first configuration to a second configuration via a first upgrade package during an upcoming first upgrade event, and also determining that an initial version of a first software component currently stored on the computing device is incompatible with the second configuration. The method also includes submitting a first update query to an online software repository regarding the first software component, and receiving, from the online software repository, a first status indicating that a first content is available to update the first software component from the initial version to a first updated version, wherein the first updated version is compatible with the second configuration. In addition, the method includes selectively downloading the first content from the online software repository to the computing device during the first upgrade event, and automatically updating the first software component from the initial version to the first updated version during the first upgrade event.

A computer readable medium, in accord with a third aspect of this disclosure, includes instructions stored therein which, when executed by a processor, cause the processor to perform operations that include verifying, at a remote cloud service, that an operating system of the computing device is scheduled for upgrade from a first configuration to a second configuration via a first upgrade package during an upcoming first upgrade event. The instructions also cause the processor to determine that an initial version of a first software component currently stored on the computing device is incompatible with the second configuration, and submit a first update query to an online software repository regarding the first software component. In addition, the instructions cause the process to receive, from the online software repository, a first status indicating that a first content is available to update the first software component from the initial version to an updated version, wherein the updated version is compatible with the second configuration, and to selectively download the first content from the online software repository to the computing device during the first upgrade event. Furthermore, the instructions cause the processor to automatically update the first software component from the initial version to the updated version during the first upgrade event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
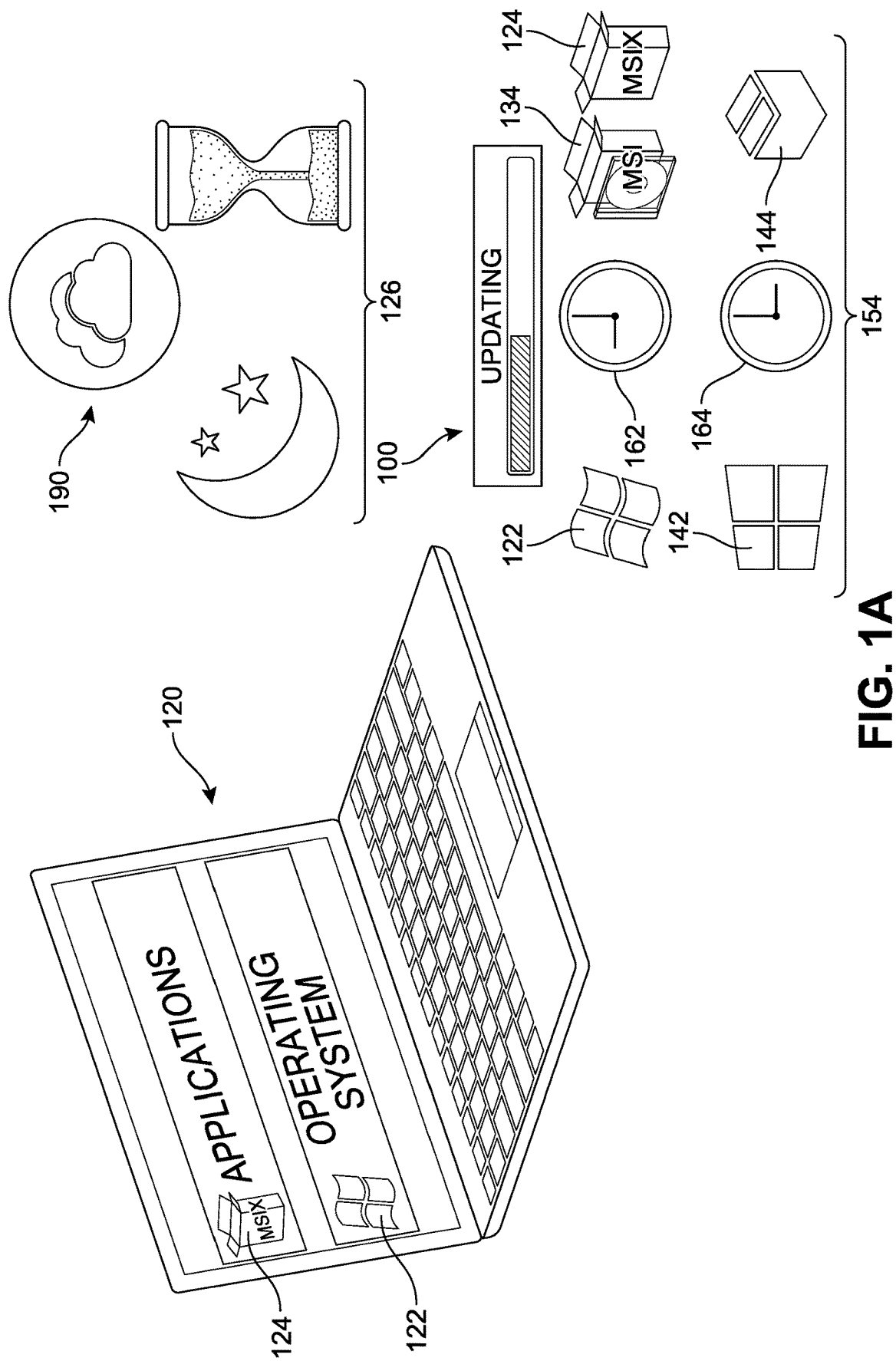
FIGS. 1A and 1B are a conceptual illustration of an implementation of an automated software update process.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

System upgrades and updates are often provided in computing and consumer electronic environments in order to replace hardware, software, and firmware with newer versions, bring systems up to date, or to improve the system's operability and characteristics. Common changes may include replacing operating systems or software programs, installing additional memory, installing new versions of software, updating security or virus programs, and providing patches. In addition, patches may sometimes be downloaded to provide a small fix or update, but not an entire new version of software, typically aiming to improve functionality or solve security issues. When an operating system (OS) for a client computing device ("computing device") is upgraded to a new configuration, previous software programs ("software items") and/or components thereof ("software components") that were stored on the client computing device can become incompatible with the new operating system configuration. In other words, performance of previously functional software components may become disrupted following an OS upgrade. Users must then determine which software programs are affected and initiate a series of updates that restore or otherwise provide the desired performance by the software.

The following description discloses systems and methods for automated software update management in conjunction with OS upgrade events. An automated software update management system ("automated update system") is configured to receive information about the upcoming OS upgrade and verify whether one or more of the software items on a client computing device will be impacted as a result of the upgrade. If the client computing device user has opted-in or otherwise enabled an automated update service, the system can determine if the client device includes versions of the various software items that are incompatible with the OS upgrade. If any of these software items correspond to versions that are not compatible, the system will automatically execute an update retrieval and deployment process to increase the likelihood that full array of software items stored the computing device will perform as expected by the user at the time the upgrade occurs, or soon thereafter, without requiring any further user input. Such proactive update procedures can reduce potential disruptions to user workflow, free users from the burdens of device updates and maintenance, and help minimize the possibility of incomplete or erroneous attempts in managing various software updates.

As a general matter, the terms "cloud computing service" or "cloud service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

In addition, an "upgrade" generally refers to a process of replacing an OS, software, or firmware product (or a component thereof) with a newer version of the same product in order to correct software bugs, improve device performance, introduce new functionalities, or otherwise improve characteristics of the software product. In one example, an upgrade can include a software patch to an operating system or a new version of the operating system. Various resources stored on client computing devices can involve one-time, periodic, or occasional upgrades in software, firmware, device drivers, etc. In contrast, an "update" generally refers to a process of modifying already existing software applications.

For purposes of reference, an update management system (UMS) refers to a system by which a user can access software updates, as well as perform a variety of update content management tasks, such as retrieve, modify, browse, and/or share the update content items, and enable a user to monitor the update activities. Generally, a user can interact with a UMS through one or more client devices that are connected to a network. A UMS can support connections from a variety of different client devices, such as desktop computers, mobile computers, mobile communications devices (such as mobile phones, smart phones, tablets, etc.), smart televisions, gaming devices, set-top boxes, and/or any other network enabled computing devices. A UMS can be configured to accept connections from and interact with multiple client devices concurrently. Typically, a user engages with a UMS through interaction with a client-side application that is installed on the client's device, or via a third-party application, such as a web-browser application, and is configured to communicate with the UMS.

Furthermore, the terms "software program", "software application", "program", "software", or "application" may be understood refer to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software. Specific references to a software application by name throughout this description should not therefore be understood to limit the use of the proposed systems and methods. In addition, synchronization can refer to an automated process by which one or more software programs are updated in association with an OS upgrade in response to a determination that the current version of the one or more software programs would be incompatible or otherwise perform at a diminished level as a result of the forthcoming or imminent OS upgrade.

Figure 1B:
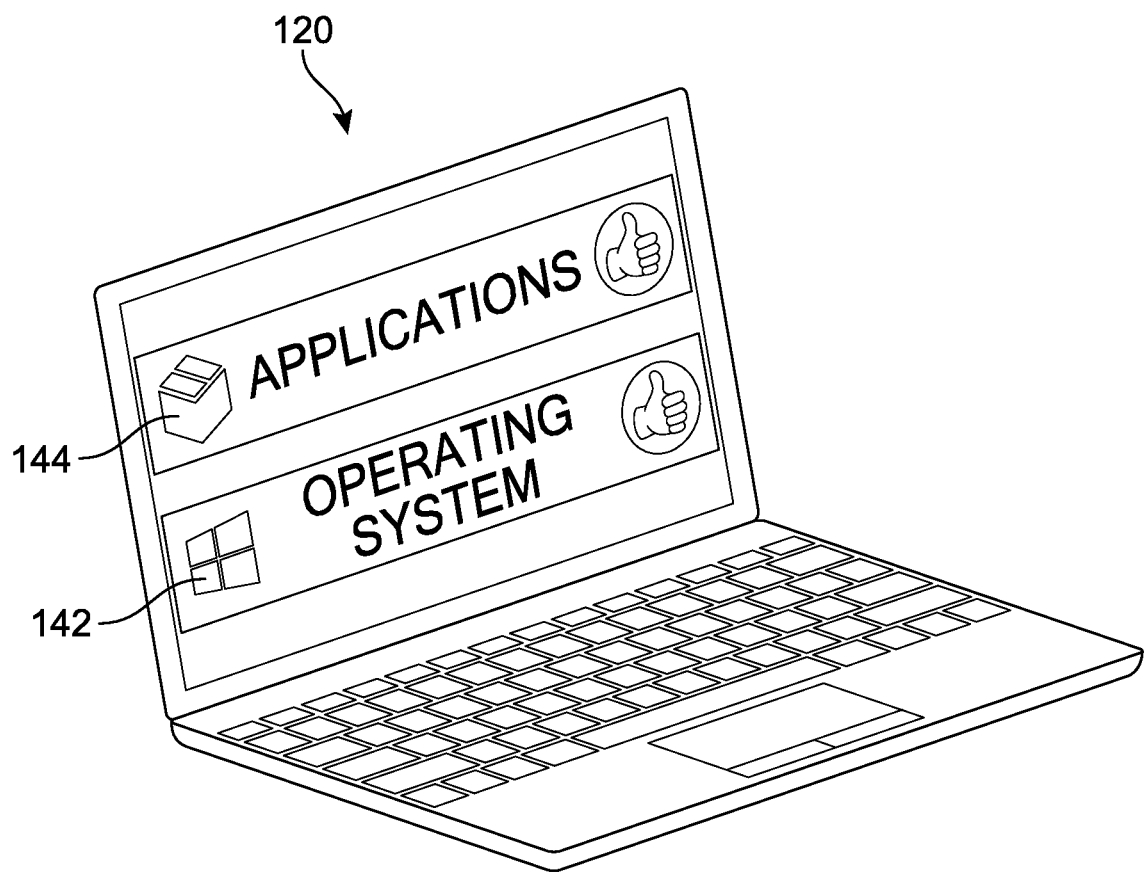
Figure 2:
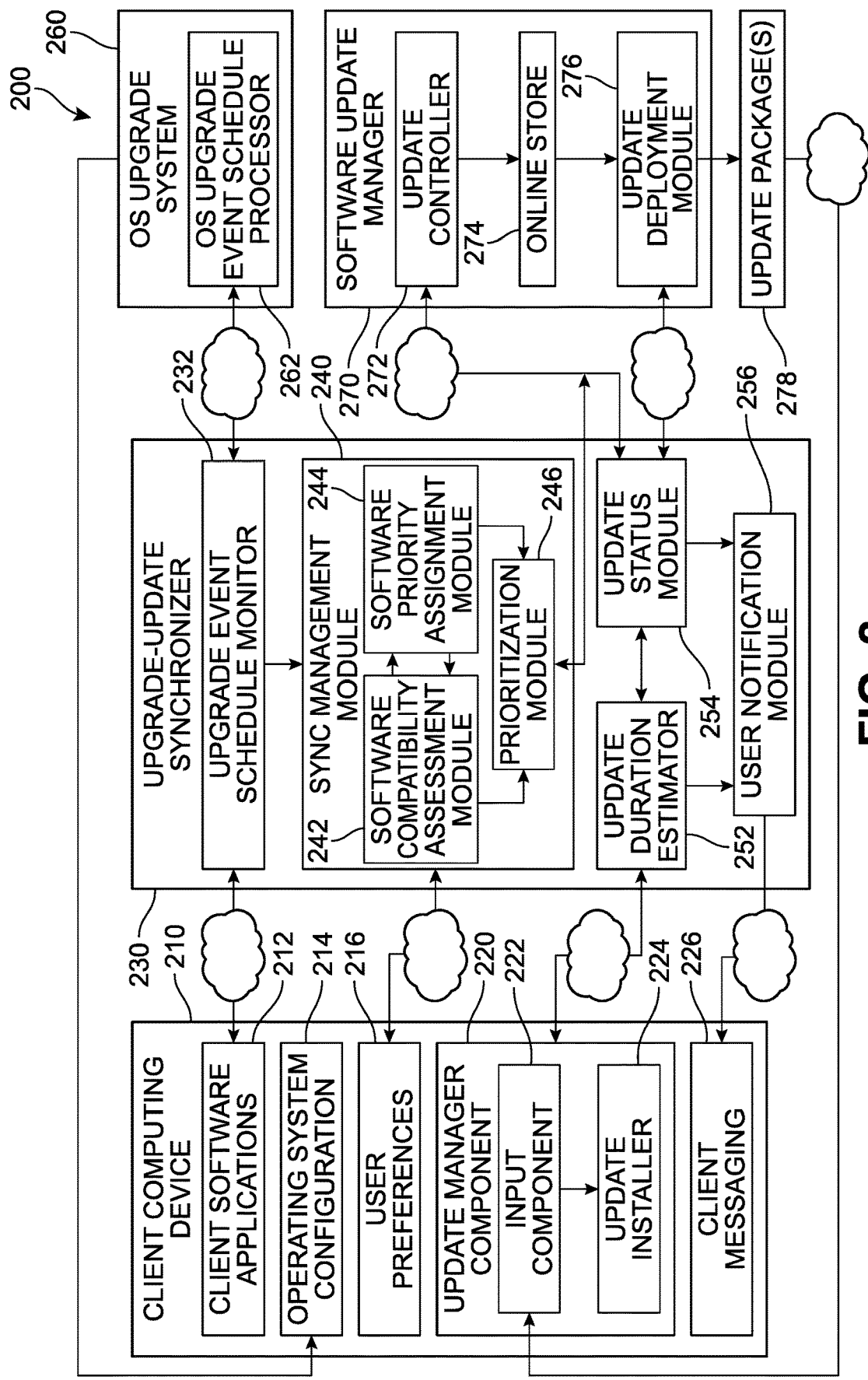
FIG. 2 is a diagram illustrating an implementation of a synchronized operating system upgrade and software update management architecture.

In order to better introduce the systems and methods to the reader, FIGS. 1A and 1B presents a high-level example of a representative automated update computing environment ("environment") 150 for implementing an automated update management system ("system", also illustrated schematically in FIG. 2). In different implementations, the environment 150 can include one or more computing device end-users, or simply "users". Users may include, but are not limited to, users of hosted online services, collaborative authoring environments, application hosting service, software hosting environments, as well as individual users. Local end-users may download or otherwise access software in their business and personal computing environments via personal computing devices. The various features and activities illustrated in FIGS. 1A and 1B are described generally, with further details and examples presented in connection with later figures.

In different implementations, an automated update computing environment can include a hosted service provider responsible for managing and providing software, hardware, and/or firmware updates, security updates, and system patches to customers. The service provider may schedule automatic software updates that occur in combination or conjunction with OS upgrades to customer systems. In some implementations, the automated update system may transmit notifications to users about upcoming updates, their availability, features, and similar technical issues, as well as provide opportunities to set preferences for automatic system updates meet compliance and compatibility requirements. The update system may also employ a mechanism for collecting and managing the customer preferences for scheduling software updates, and to initiate and perform the updates' installation processes.

As an example, a first user account ("first user") 110 is accessing or otherwise authorizing activity of an update management client application ("update client") 100 on a first device 120. The first device 120 may be a personal computer such as a desktop or laptop computer, a mobile device, or any other computer system having a file system. The first device 120 executes an operating system such as Microsoft Windows®, Mac OS®, Unix®, or other operating system, and includes memory, storage, a network interface, and other computer hardware not illustrated in FIGS. 1A and 1B for clarity. The first device 120 creates, modifies, and/or deletes files on its storage system via its operating system, with the modifications that will be described herein. For example, the first device 120 can be connected to a server, or an online or cloud-based storage and computing service ("software repository service") 190. During use of the first device 120, the first user 110 can add, delete, or modify software components stored on first device 120.

In FIG. 1A, the first device 120 includes a first OS configuration 122, and a plurality of software components that are each representative of an initial version 124. It should be understood that while the phrase "initial version" is used herein, it is intended only to refer to the state of the software in the context of a pre-update software version, rather than referring to the original version of said software. As will be discussed in greater detail below, as the first device 120 is scheduled for an OS upgrade, the update client 100 may be configured to, in response to a determination that the upgrade is forthcoming or will occur shortly, begin to schedule the download of content corresponding to items of the OS upgrade package. In many cases, this process is scheduled for period(s) of time 126 in which a user is not using the first device 120, for example during nighttime or early morning hours. In addition, either prior to, during, or shortly after the download of the OS upgrade package content, the first device 120 begins to receive content corresponding to updates for one or more software application packages stored on the first device 120. In other words, in some implementations, the OS upgrade process can trigger an automated deployment of updates for a plurality of software stored on the client device in a process that is approximately synchronous or concurrent with the OS upgrade. In some implementations, it can be understood that this process will occur only in those cases where consent or authorization was obtained from the first user or accounts associated thereof (either immediately before each automated update session occurring in conjunction with the upgrade event(s), or as a general consent obtained at an earlier time that applies to all or most update sessions).

Thus, during an upgrade event there may be a substantially concurrent update event (see updating session 154) that occurs between a first time 162 and a second time 164. In some implementations, the OS upgrade package can be downloaded and the OS can be upgraded from the first OS configuration 122 to a second configuration 142. In a parallel process, the initial version 124 of various applications that were determined would become incompatible with the second OS configuration 142 are also being modified to respective updated versions 144 via update packages 134. In FIG. 1B, the first device 120 has rebooted. Rather than be faced with the inconvenience of now having to identify and manage the update of software components that would otherwise have been incompatible with the OS at this time, a user can immediately return to their normal device usage, confident that all updates necessary to prevent disruptions to their workflow have been managed on their behalf.

In traditional paradigms, users manage software updates for download and/or installation on their devices following various operating system modifications and upgrades by a manual selection of such updates. These updates typically are motivated by discovery by the user after the new OS initialization that one or more of their software programs is experiencing compatibility and/or compliance issues. In other words, the process is manual and typically reactive. The proposed systems and methods offer an automated and proactive alternative. As a general matter, an automated update session will refer to the implementation of a remotely managed update management process directed to one or more user devices. While in some implementations the user may be notified or messaged regarding the upcoming updates, and/or be asked to provide a user input to the system before updates begins, the overall processes described herein are configured to occur in a substantially automated manner, whereby the user can either continue working at their device and—if desired—monitor progress of the updates, or simply step away from the device while the update sessions take place.

Thus, in different implementations, following a determination that a device is scheduled for an OS upgrade, the system can automatically take steps to stabilize the user account by automatically initiating a series of software update deployments and installations in conjunction with the OS upgrade event. In order to provide further context for the uses and applications of the systems described herein, FIG. 2 presents a non-limiting example of an automated update management system ("system") 200 that operates in conjunction with or in response to an OS upgrade event. FIG. 2 includes a client computing device ("client device") 210, an upgrade-update synchronizer 230, an OS upgrade system 260, and a software update manager 270.

In different implementations, the client device 210 can include a plurality of stored client software applications 212, as well as an operating system of a particular 'first' configuration 214 that can be scheduled for upgrade event(s) as determined and/or communicated by OS upgrade system 260. In some implementations, the OS upgrade system 260 can include a series of upgrade packages that will be deployed to the client computing device 210. The upgrade package(s) may in some cases reference or identify one or more (though not always all) software applications that are expected to be impacted by the proposed upgrade.

The client software applications 212 can correspond to one or more programs stored at least in part on the client device, or a cloud-based service that is accessed via the client device. For example, the client software applications 212 can be associated with services that handle or manage user account information and data with additional hosts or clients in a distributed computing environment. In other non-limiting examples, execution of the client software applications 212 can provide voice-over-IP conference calls, online gaming services, file management services, computational services, or other suitable types of cloud services that include components stored on the client device. In other implementations, the software applications can reside mainly or entirely on the client device (e.g., be also available to the user offline). In some implementations, the client software applications can be "trusted," for example, when the client software applications are released or verified by operators of a distributed computing environment and software content managed by an online repository, while in other cases the client software applications can be "untrusted" when the client software applications are third party applications or otherwise unverified by such operators.

In addition, various preferences and settings associated with a user account can be modified or submitted via a user preferences component 216 as discussed herein. In some implementations, the upgrade-update synchronizer 230 can be configured to receive information from the client computing device 210 regarding the software applications 212, as well as an OS upgrade event schedule processor 262 of the OS upgrade system 260 in order to determine when and whether a synchronized software update should be scheduled in conjunction with the OS upgrade event. In different implementations, the upgrade-update synchronizer 230 can be configured to verify that the operating system of the computing device is scheduled for upgrade from a first configuration to a second configuration (for example, via upgrade event schedule monitor 232).

In addition, in one implementation, a sync management module 240 can receive instructions from the upgrade event schedule monitor 232, which can provide the information needed to trigger or initiate the update process. The sync management module 240 can begin to collect and coordinate current information regarding the various software items, the assignment of priority classifications, and any user preferences, to generate a task sequence or update schedule for the automated process. In different implementations, the sync management module 240 can also determine that an initial version of a first software component currently stored on the computing device is incompatible with the second configuration. For example, a software compatibility assessment module 242 can review the various software 212 residing on the client computing device 210 to determine whether the pending OS upgrade 260 will require modifications to any of the software programs (e.g., call for the installation of an update) in order to perform normally following the OS upgrade event.

Along with this assessment, a software priority assignment module 244 can review the software items that have been determined to require updates and calculate or otherwise assign levels of priority to each. In some implementations, the system 200 can include provisions for automatically assigning such priority labels based on discrete categories (e.g., high priority, intermediate or average priority, or low priority) or may be configured to generate a distinct sequence of priority to each software instance, relative to the priority for other software instances in the group of applications that are to be updated (e.g., 1st, 2nd, 3rd and so forth). This information may be sent to a prioritization module 246, where a final prioritized update task sequence may be created, updated, and maintained. In different implementations, this information can be used by the prioritization module 246 as it submits an update query to an online software repository regarding the different software components (for example, for submission to the software update manager 270).

In some implementations, the task sequence can be sent to an update controller 272 of the software update manager 270 that is configured to develop update workflows based on data received from the upgrade-update synchronizer 230. In some implementations, update controller 272 manages the update process, which includes updating the client programs and determining a successful deployment of updates at the appropriate times. In some implementations, the update controller 270 can allow users to influence an update workflow to the client system (not shown here). In another aspect, the update controller 272 can be configured to enforce certain rules regarding progress or completion of applying the available updates. In FIG. 2, the update controller 270 is shown as a separate component within the software update manager 270; however, in other implementations, the update controller 272 can also comprise another computer system, a computing service provided by another client device, a stand-alone server, or a part of a platform controller (not shown) of a distributed computing environment.

Once the update controller 272 receives the task sequence, a request or query (or multiple queries) may be submitted to a software repository or online store 274. For example, the update controller 272 can make user of query modules configured to query online store 274, a manufacture's software database, or other suitable sources for available updates. The online store 274 can provide the requested updates and associated information via an update deployment module 276. For example, the requested updates can be transmitted as one or more update packages 278 to an input component 222 of an update manager component 220 of client computing device 210.

In different implementations, the update manager component 220 can be configured to monitor execution of all client software updates and provide input to update workflows. In further implementations, the update manager component can also contain data representing a progress threshold, a completion threshold, or other suitable data that may be shared with an update duration estimator 252 of the upgrade-update synchronizer 230. In some implementations, the upgrade-update synchronizer 230 can receive, from the online software repository, one or more status messages indicating that content(s) is/are available to update the identified software components from their initial version to an updated version compatible with the second configuration of the operating system. This information can be used to modify the task sequence and/or prioritization order in some cases. Furthermore, the prioritization module 246 can be responsible for enabling a selective download of content(s) from the online software repository to the computing device during the first upgrade event that were identified as being necessary. In some implementations, the sync management module 240 can then automatically update the software component from their initial version to their respective updated version during (or shortly before or shortly after) the OS upgrade event.

In further examples, the update manager component 220 can also help determine a preferred sequence of downloading and/or applying the updates based on corresponding client configurable rules or preferences 216. Furthermore, the input component 222 can be configured to receive available updates (e.g., update packages 284). Once the update packages are received, an update installer 224 can be configured to facilitate installation of updates to the computer system. In some implementations, the system 200 can include provisions for determining or otherwise generating a schedule for the automated updates process based at least in part on this information. For example, in order to ensure a timely installation and availability of the various (updated) software programs, an estimate of the duration of each download and installation can be obtained or produced (see update duration estimator 252), which can be shared with an update status module 254 that can remain abreast of changes in network speed, device connectivity and activity, changes in software components, deployment rates and progress, and other properties that can affect the update schedule. For example, in some implementations, the automated updates system can be configured to identify a client context. Generally, the client context includes characteristics of a client infrastructure. In some cases, the system may determine what resources the client has deployed (e.g., physical or virtual machines, applications running on the machines including supporting files) and what resources may be impacted by an identified update. This information can be used to facilitate a software update deployment that minimizes the impact on the client. In some implementations, the update(s) can be deployed in batches to ensure there is not a drain on the client's resources, thereby reducing any service interruption to the client. As one example, the batching can be performed based on information stored in the client upgrade profile such as a preferred batch size. In some implementations, the schedule can be planned such that the higher priority updates are downloaded at a time prior to the OS upgrade event, thereby accommodating the estimated total deployment time for all updates. This can contribute toward ensuring all necessary updates are installed prior to the initialization of the OS upgrade, helping to minimize disruption to the user.

In many cases, less than all batches are processed at once (e.g., one batch is processed at a time) to decrease any discernable effect on the client computing device 210. For example, following a download one or more software applications can be updated (e.g., all at once, sequentially, in groups, etc.), and a diagnostic test is performed on the updated software to determine whether the identified update was successfully deployed. In some implementations, updates may occur with or without client intervention. For example, a client may be provided with a notification (see client messaging 226) that one or more software applications are ready for updating, and a time limit may be provided to the client within which the client may choose to trigger the update(s). If the client does not trigger the update within the allotted time, the update may proceed automatically (in the background). Additionally and/or alternately, updates may occur without prompting the client. In this manner, the system may determine whether an update has been successfully deployed and a software change has been made.

Furthermore, as described herein, in some implementations, the system can be configured to provide status messages to the user and/or request authorization from the user for various stages of the automated updates process. This can be managed, for example, by a user notification module 256 that can transmit message content to the client messaging component 226 of the client computing device 210.

It should be understood that other arrangements and elements (e.g., machines, interfaces, functions, orders, and groupings of functions, etc.) can be used in addition to or instead of those shown, and some elements may be omitted altogether. Furthermore, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Referring now to the sequence illustrated in FIGS. 3-8, a further example of a scenario in which an automated updates management system ("system") is implemented is presented. Beginning with FIG. 3, a client device 300 is depicted at a first time 350 ("3:00 PM" on "Monday the 22$^{nd}$"). At this first time 350, a determination is made that an operating system of a first configuration 310 is scheduled for an upgrade. The system presents an optional first message 312 via a device display 320 to notify the user of the pending upgrade and to provide an opportunity for the user to modify the scheduled event. In some implementations, the first message 312 may also include information related to the update of software referenced by the upgrade. Generally, software referenced by the upgrade will be affected by the new OS configuration and older versions of said software will require an update. In some optional implementations, a user may first receive an automated request from the system that informs the user of the planned upgrade event and corresponding software update session and asks the user to provide authorization, approval, or acknowledgement in order to proceed.

Figure 3:
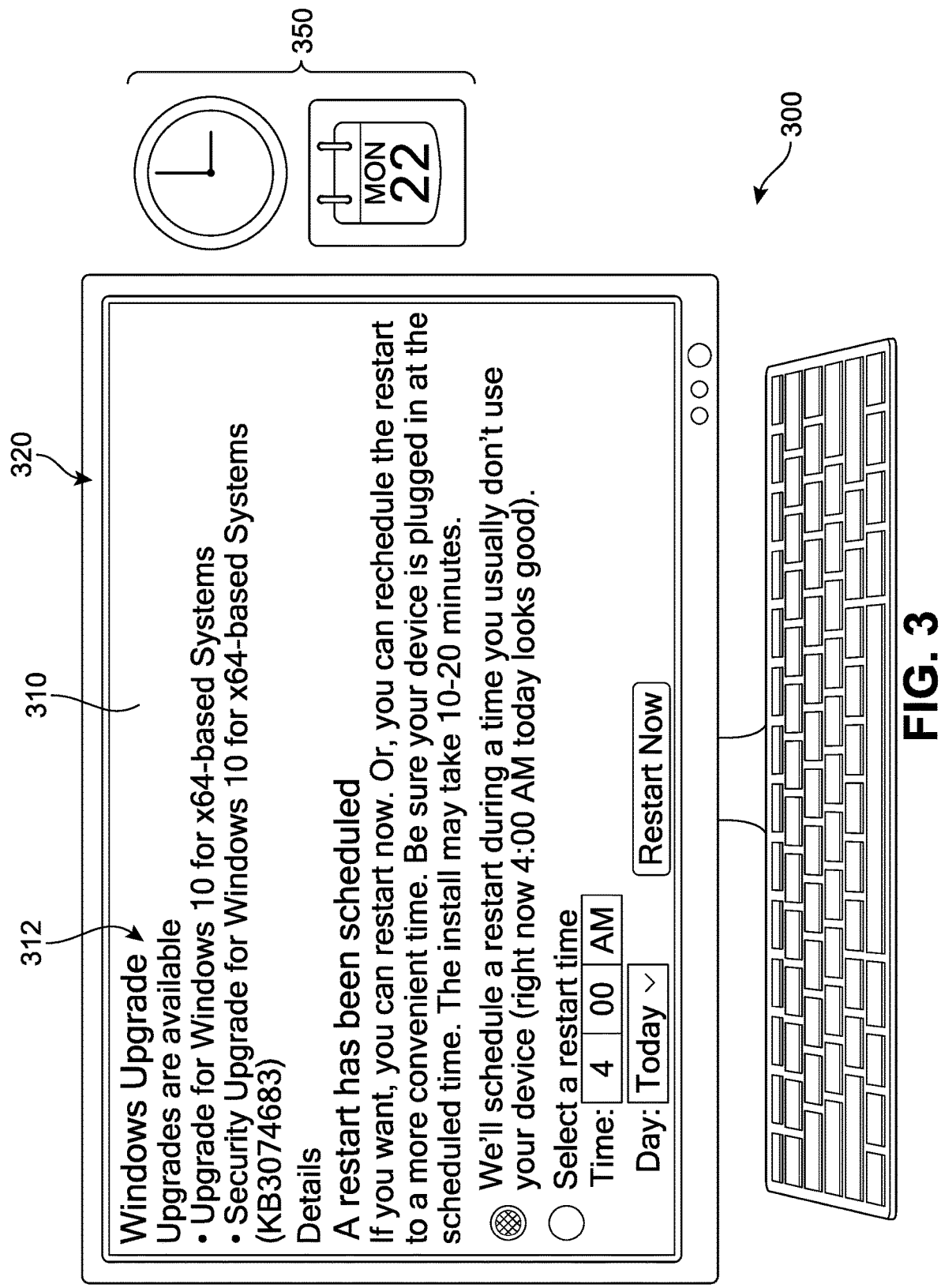
FIG. 3 is a conceptual illustration of an implementation of a malware attack and a corresponding malware detection.
Figure 4:
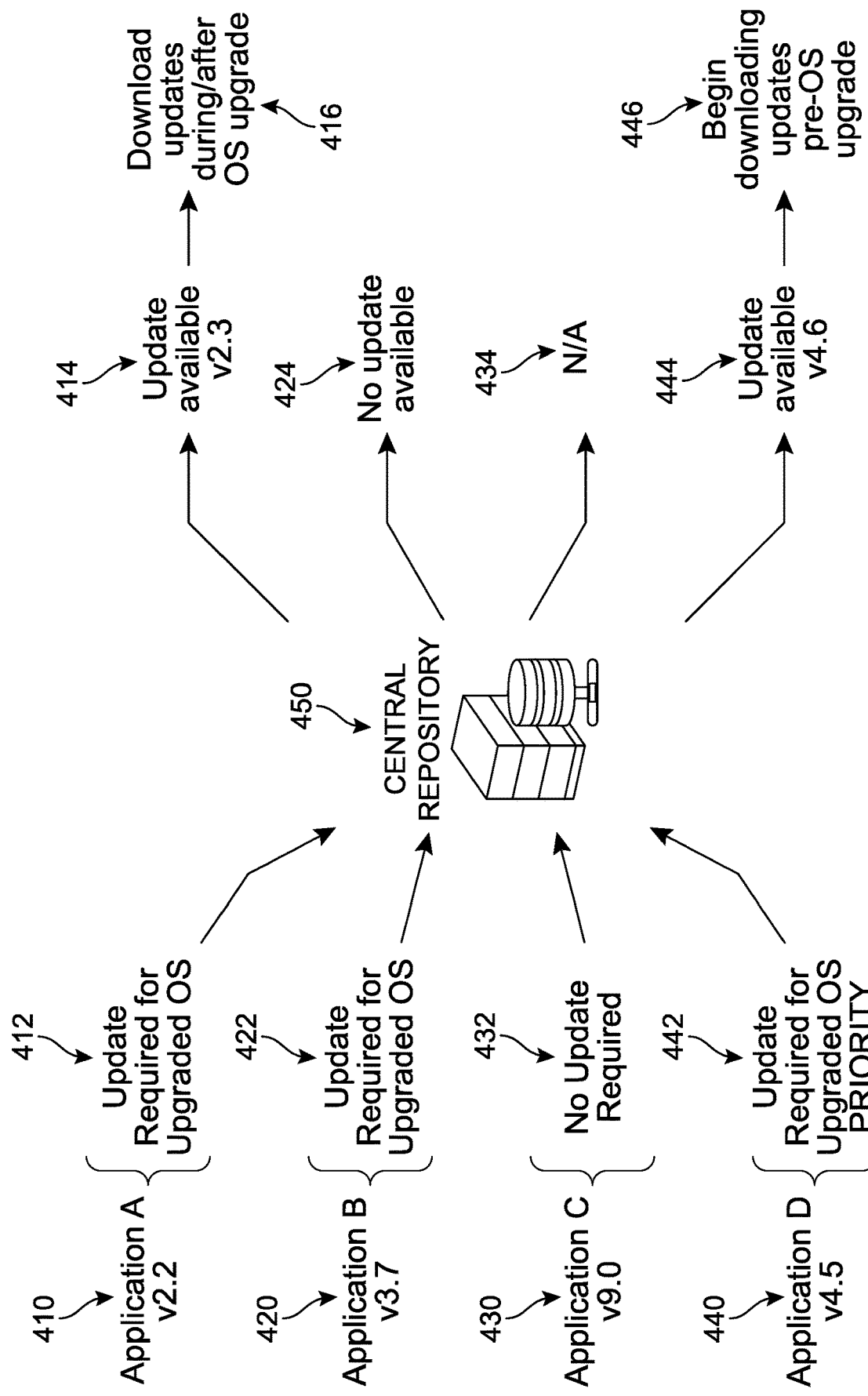
FIG. 4 is a conceptual diagram of an implementation of a determination of a incompatibility issue and corresponding software update availability.

In different implementations, the system can include provisions for determining whether any software stored on the client device 300 is incompatible with the upcoming upgrade and generating instructions or workflow for ensuring updates (if any) for such software are obtained. In FIG. 4, an overview of an implementation of this process is depicted. In the example of FIG. 4, upon or shortly following a determination that the client device is scheduled to undergo an OS upgrade, the update client can review and assess whether any of a plurality of software program components ("software components") will be affected by the OS upgrade. On a left-hand side of FIG. 4, a plurality of software programs stored on the client device shown in FIG. 3 are listed, including a first software 410 ("Application A v2.2"), a second software 420 ("Application B v3.7"), a third software ("Application C v9.0"), and a fourth software 440 ("Application D v4.6"). It should be understood that the number of software programs that may be identified on a device can vary widely, and the four programs represented here are shown for purposes of illustration only.

In this example, at a first stage 412, the system determines that the version currently installed on the client device for first software 410 will be incompatible after the upgrade. In some implementations, such a determination can trigger a query to an online store or central software repository 450 from which information and update packages for software may be obtained. The system confirms that an update is available for the first software 410 at a second stage 414. In some implementations, the system can also identify the priority classification for the software. In this case, the first software 410 is low priority, and the system can initiate an automated update for the first software in a third stage 416 during or even after the OS upgrade.

In another example, at a fourth stage 422, the system determines that the version currently installed on the client device for second software 420 will be incompatible after the upgrade. This determination triggers, at a fifth stage 424, a query to the central software repository 450 where the system confirms that no update is available for the second software 420, or at least that no update may be presently obtained from the software repository configured to work in concert with the system. In this case, the second software 420 cannot be automatically updated. In some implementations, a message can be conveyed to the user account to inform them of the likely effects the upgrade will have on the performance second software 420. In one implementation, the system may guide the user to other software resources that may offer or provide the update for the second software 420. This may occur in cases where the software was originally obtained from a source outside of the trusted vendors associated with the system and/or a software resource that is no longer configured to offer updates through the central repository 450.

In a third example, at a sixth stage 432, the system determines that the version currently installed on the client device for third software 430 will be compatible after the upgrade. In other words, the third software 430 will remain functional and perform as expected following the OS upgrade. Thus, no further action is triggered in a seventh stage 434. As another example, at a eighth stage 442, the system determines that the version currently installed on the client device for fourth software 440 will be incompatible after the upgrade. This determination triggers a query to the central software repository 450. The system confirms that an update is available for the fourth software 440 at a ninth stage 444. As noted above, in some implementations, the system can also identify the priority classification for the software. In this case, the fourth software 440 is high priority, and the system can initiate an automated update for the first software in a tenth stage 446 that occurs prior to the downloading of content for the OS upgrade, in order to ensure that the fourth software 440 will be fully installed and functional at the time of the upgrade.

Figure 5:
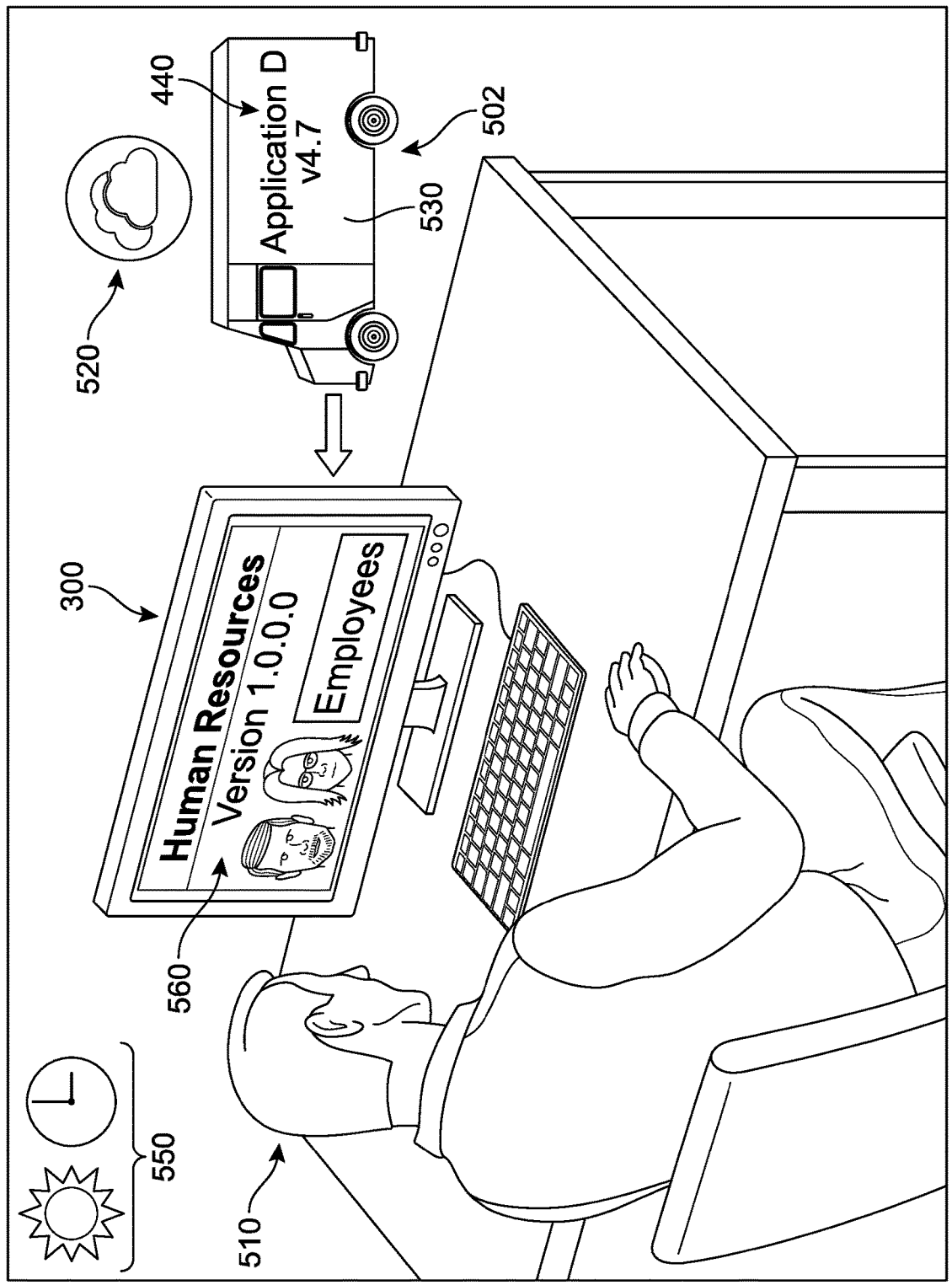
FIG. 5 is a representation of an implementation of a pre-loading of a high priority software update package.

Referring now to FIG. 5, an example of such a 'high priority' software update download session is illustrated. In FIG. 5, a user 510 is interacting with client device 300 and enjoying the capabilities provided by a fifth software 560 ("Human Resources" v 1.0), prior to the OS upgrade event, at a second time 550 (subsequent to the first time 350 of FIG. 3). In other words, a normal user operation experience is occurring. Around second time 550, while the user works on and relies on the functionality of client device 300, an automated update session has been initiated for a high priority software program, fourth software 440 ("Application D"). Thus, prior to the occurrence of the OS upgrade, update content 530 for the fourth software 440 is downloaded from the online store via a network 520 and conveyed 502 to the client device 300. This frontloading of significant or sensitive software updates—a type of 'jumping the queue' type process—can decrease the likelihood of disruptions in performance of high impact software components following the OS upgrade. For example, an older version of a language-related software that will be affected by the new OS to the extent that the user may be subjected to miscommunications or communications in other languages would be classified as high-priority.

Figure 6:
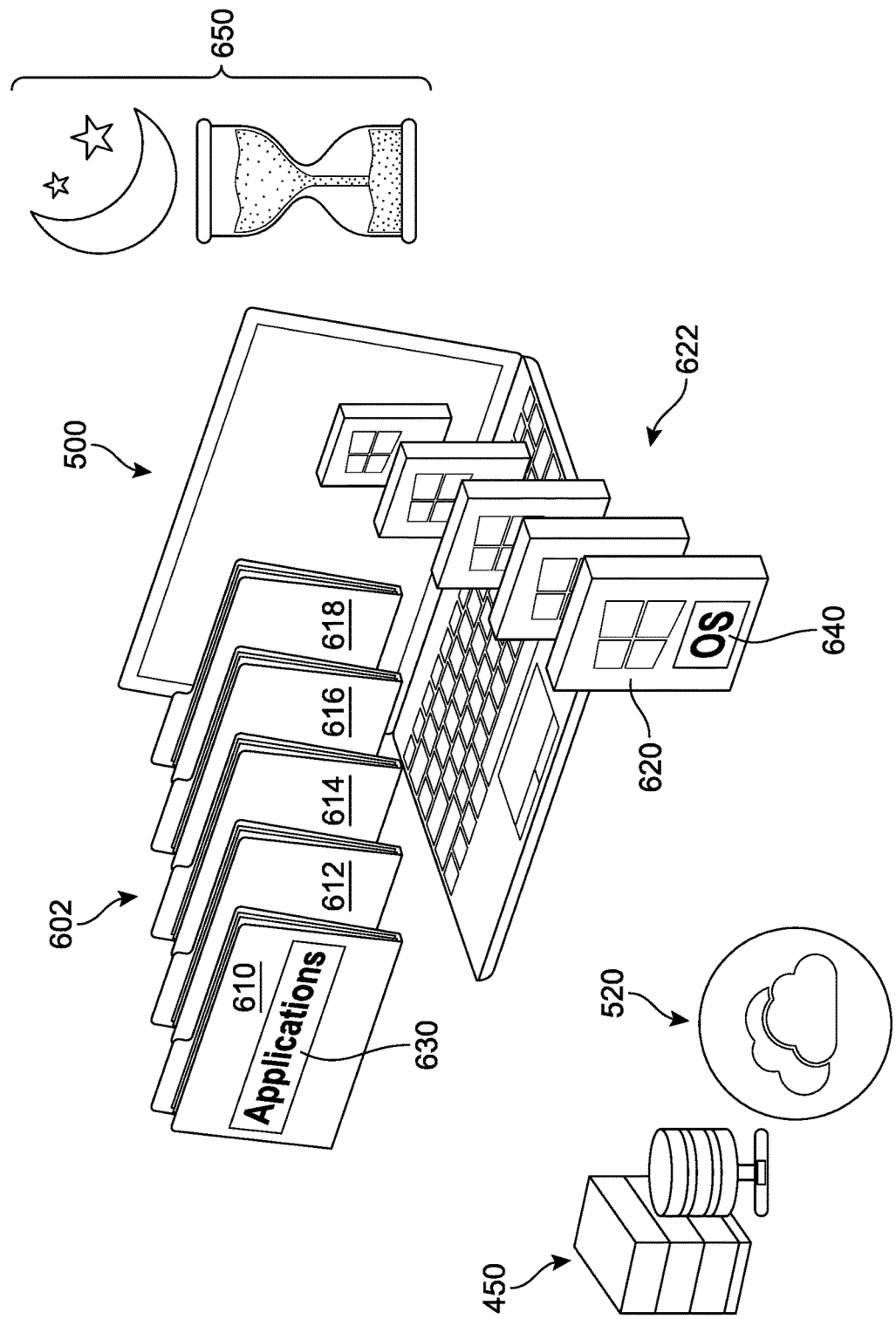
FIG. 6 is a representation of an automated software update process occurring in conjunction with an operating system upgrade event.

In FIG. 6, for purposes of illustration, a depiction of an implementation of a concurrent software update session and OS upgrade event is shown. During a third time 650 subsequent to the second time 550 of FIG. 5, the two processes occur in a substantially synchronous period, whereby a set of update packages 602 for a plurality of software applications 630 and a series of upgrade packages 622 for an operating system 640 are downloaded via network 520, for example, from the central repository 450. As the operating system 640 is upgraded to a second configuration 620, multiple content items for applications also scheduled for update can be received. In this example, a first content package 610 for the first software application 410 (see FIG. 4), as well as a second content package 612 for a fifth software application, a third content package 614 for a sixth software application, a fourth content package 616 for a seventh software application, and a fifth content package 618 for an eighth software application. One or more of these packages can be downloaded concurrently with portions of content directed to the OS upgrade. In another implementation, downloads of one or more of the software update content packages can be interspersed between downloads of the upgrade content. In another implementation, a package sequence can be created whereby the order in which the packages are downloaded can be identified, selected, or otherwise ascertained in advance of the download. For example, items classified as being of higher priority than other items may be downloaded first or toward the beginning of the process. In some implementations, software updates may be downloaded prior to some or all of the upgrade packages, while in other implementations, software updates may be downloaded following the download of the upgrade packages, but prior to a reboot or transition to the new OS.

Figure 7:
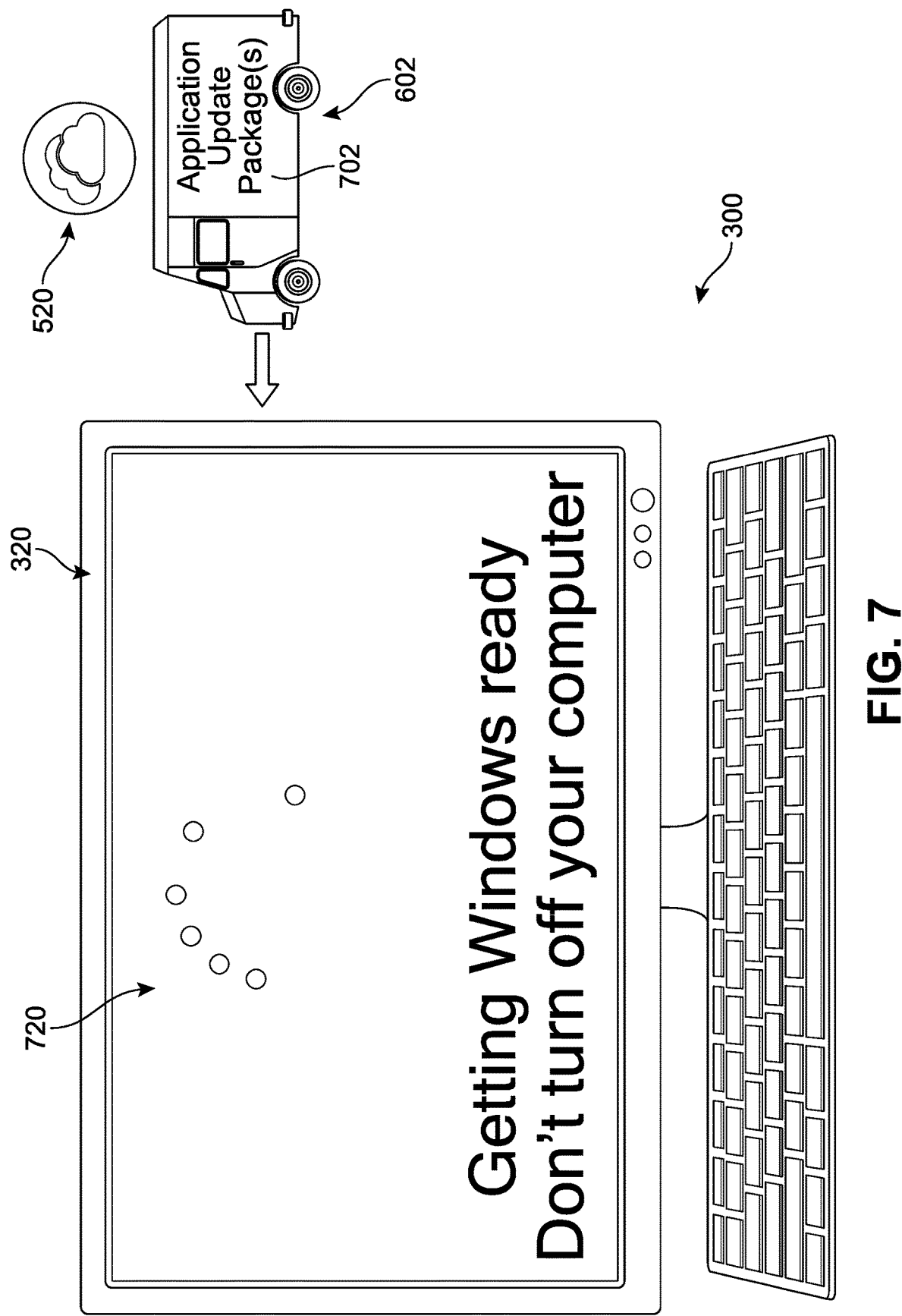
FIG. 7 is a representation of a device display with an implementation of a notification of the occurrence of an upgrade initialization while software update packages continue to be received.
Figure 8:
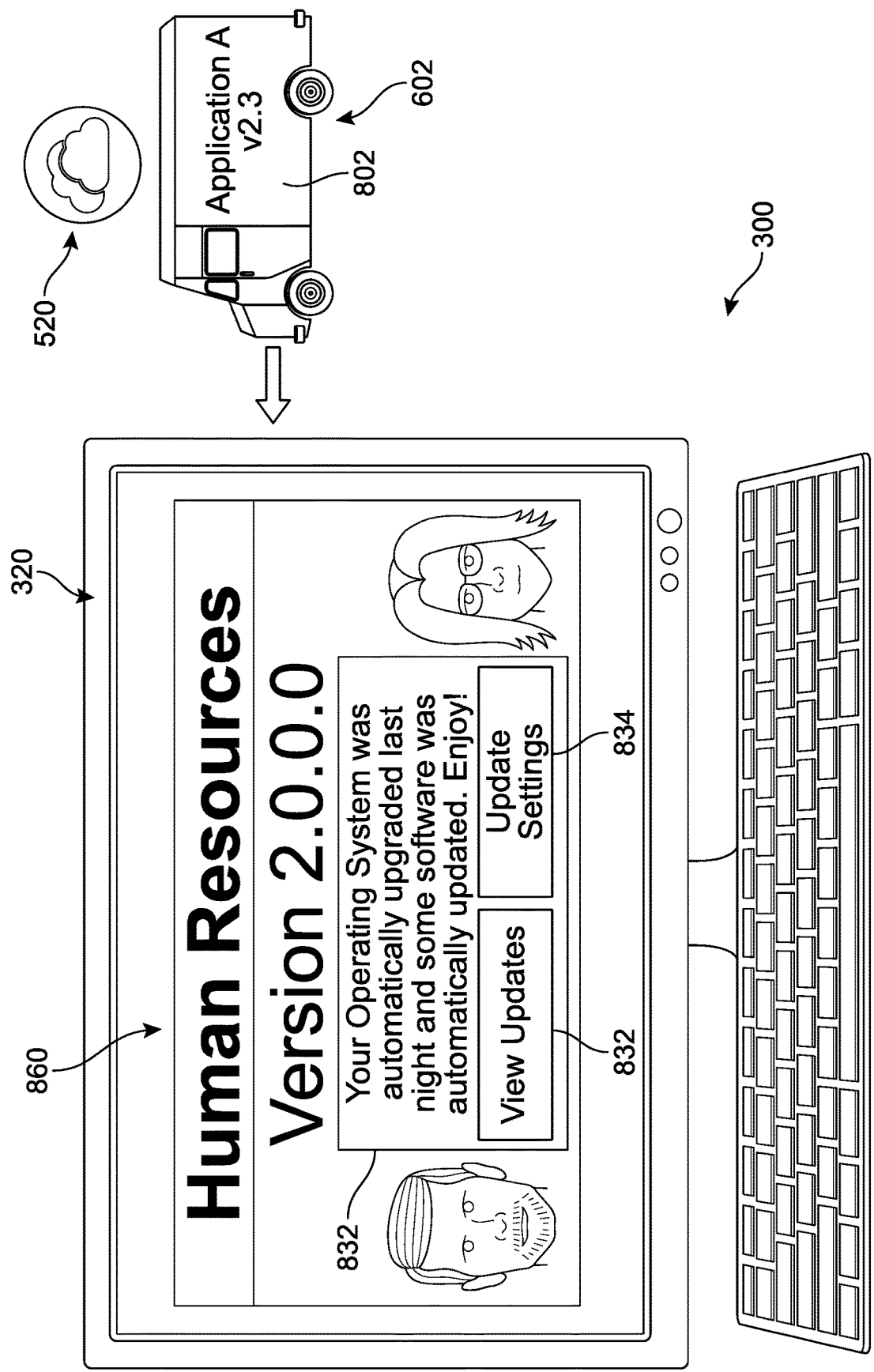
FIG. 8 is a representation of a device display with an implementation of a post-upgrade scenario, while a low priority software update package continues to be received.

In different implementations, the system can be configured to continue the software update process during initialization of the second configuration of the OS. As shown in FIG. 7, the operating system has undergone the requisite OS upgrade process and is in the final stages 720 of the OS transition. At this time, in some implementations, automated software updates 702 may continue to be downloaded 602. In other words, even during the new OS initialization, the system can take advantage of any bandwith of network 520 and/or processing capacity, and receive any queued content packages. Similarly, in some implementations, the system can be configured to continue the software update process following initialization of the second configuration of the OS. As shown in FIG. 8, the operating system has been upgraded and the client device 300 rebooted. At this time, in some implementations, automated software updates 702 may continue to be downloaded 602. In other words, even following the reboot and during the launch of the second configuration of the OS, the system can continue to receive updates for software affected by the upgrade.

For example, in FIG. 8, the client device 300 is again illustrated, where an example of a 'low priority' software update download session is illustrated. In this case, an OS for client device 300 has been upgraded to second configuration 620. An optional message 830 informs the user that the upgrade completed successfully ("Your operating system was automatically upgraded last night. Enjoy!"). In addition, while the user enjoys software 860 ("Human Resources" v 2.0) that has been updated for performance within the framework of the second configuration, an automated update session can be continued and/or initiated for a low priority software, such as first software 410 ("Application A"). Thus, at a time subsequent to the OS upgrade, update content 802 for the first software 410 is downloaded from the online store via network 520 and conveyed 602 to the client device 300. This back-loading of software updates of lesser significance can be applied when the updates have minimal impact in performance following the OS upgrade. For example, an older version of a gaming application used only once before by the user or a printing application that is expected to be affected only with respect to a single document extension type are possible examples of software updates that may be classified as low-priority.

As noted earlier, in different implementations, the system can include provisions for obtaining authorization from the user for the processes described herein. For example, during or following the upgrade and automated software update processes, in different implementations, a user may be notified of one or more stages in each process. These notifications can be automated, and may be transmitted per system settings and/or user preferences. One example was shown in FIG. 8, where optional message 830 is displayed. While a pop-up message is presented for purposes of this example, it should be understood that in other implementations, any other form of communication associated with the user's account may be used to provide such information, including but not limited to text messages, chat messages, email messages, automated phone calls, symbolic indicators (shown briefly or multiple occasions on the display while the processes occur), or other native controls can be used. In some implementations, the message 830 can also offer the user one or more selectable options or links, or otherwise provide guidance or suggestions as to how the user may obtain additional or more detailed information. For example, the message 830 includes a first selectable option 832 for viewing further details ("View updates") and a second selectable option 834 for accessing or viewing settings or preferences related to the updates or upgrade ("Update Settings"). In other cases, only the term "upgrade" may be used in the message to the user, because while the upgrade and updates can occur across two parallel processes, in some implementations, the outcome can be presented in a merged or unitary aspect for the benefit of the user, who may experience both of these changes or modification sessions in a single timeframe. However, in other implementations, the two processes can be maintained as two separate events during presentations of information to the user. Such options can also offer or allow the user to navigate to other menu interface from which the user can make modifications to their automated processes, as well as undo a software update if so desired. For example, the user may wish to opt-out of one or more steps of the automated processes, opt-in to other services to increase automation, and/or request that notifications be provided via a different mechanism.

In general, an "interface" can be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application. Selectable or actuatable options or buttons are configured to receive user inputs and trigger such actuation events.

In addition, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

Figure 9:
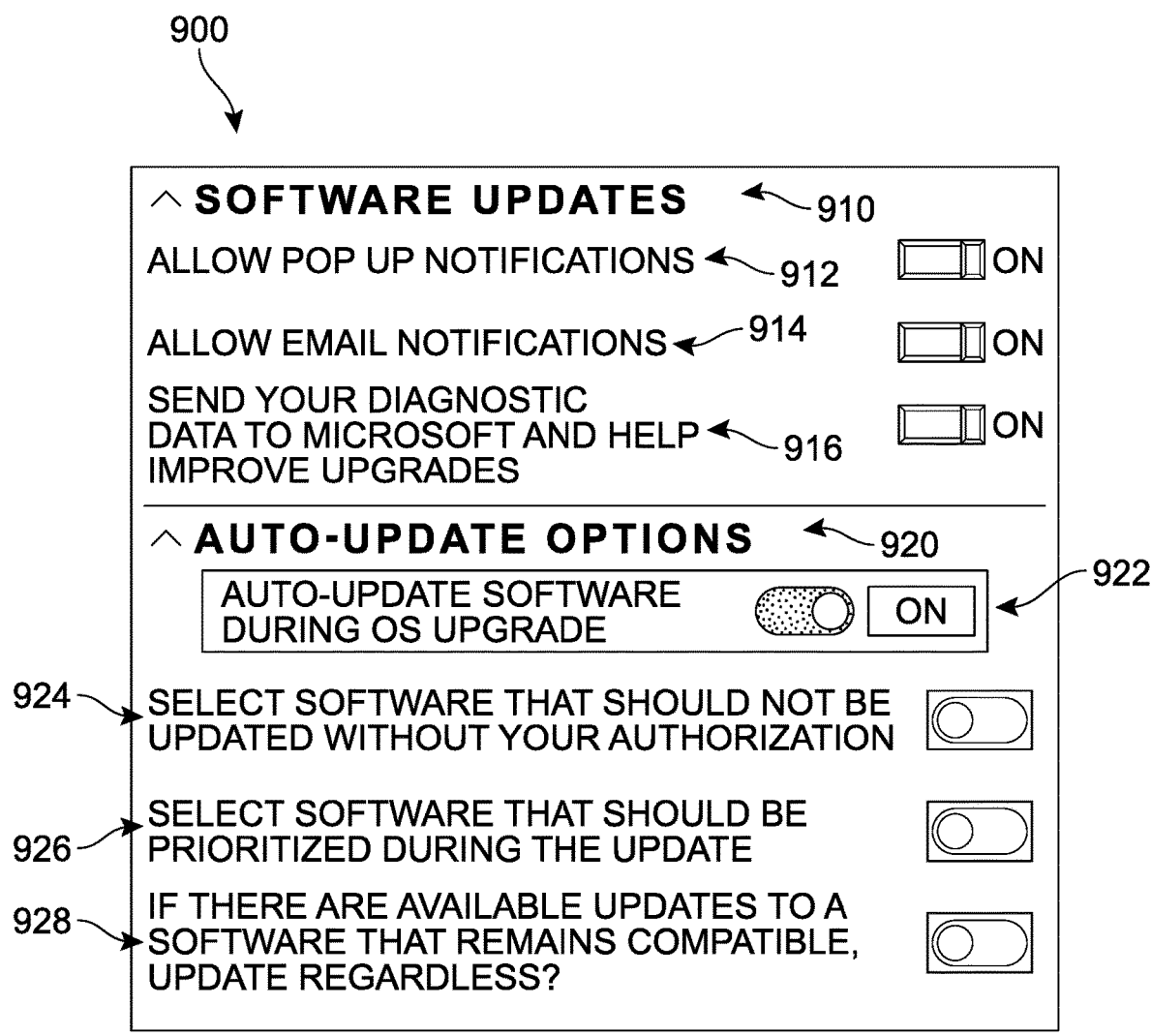
FIG. 9 is an example of a user interface for adjusting user preferences for automated software updates of a user device.

For purposes of illustration, an example of a user interface 900 for adjusting user preferences and providing authorization to the automated processes is shown with reference to FIG. 9. In this case, the user interface 900 presents general options for the software updates in an upper section 910 and options directed more specifically to automated updates in a lower section 920. In the upper section 910 a user is offered a first selectable option 912 to authorize or enable pop-up notifications, a second selectable option 914 to allow email notifications, and a third selectable option 916 to allow data about the updates to be shared with a service provider, for example to help improve the process. Additional settings for automated updates in the lower section 920 include a fourth selectable option 922 for authorizing the automated process ("Auto-Update Software During OS Upgrade?"). If this is selected or authorized, other options can become available or selectable, such as a fifth selectable option 924 ("Select software that should not be updated without your authorization") which can trigger presentation of a secondary menu or interface whereby a list of software currently stored on the client device is shown and the user can manually select which software is to be excluded from the automated process. In addition, a sixth selectable option 926 ("Select software that should be prioritized during the update") can be offered, which can trigger presentation of a secondary menu or interface whereby a list of software currently stored on the client device is shown and the user can manually select which software is to be classified as high priority during the automated process. In other words, the user can identify one or more software programs that should be given precedence with respect to the deployment of updates when an OS upgrade occurs. Another example option is a seventh selectable option 928 ("If there are available updates to a software that remains compatible, update regardless?") which can override the system default of only auto-updating programs that are known or determined to be incompatible with the new OS configuration and instead attempt to proceed with a more generalized updating process that encompasses all software components that have updates available in the online store at the time of the OS upgrade. It should be understood that the options and their arrangement shown herewith are presented simply for purposes of illustration, and many other possible user preference settings or tasks are possible, including but not limited to those providing or adjusting the implementation features described earlier with respect to FIGS. 1-8. Furthermore, the disclosed process and system can be applicable to both enterprise environments, which typically include network administrators and other information technology workers, as well as consumer-level entities that frequently delay or struggle with maintaining appropriate updates on their personal computing devices. These automated processes allow individuals to feel confident that their system is being maintained securely and reliable, even in the absence of network supervisors.

As discussed herein, in some cases, one or more software applications can be either de-prioritized in the update queue, or may not have an update available. In some implementations, the system can include provisions for maintaining the robustness and reliability of the software update process. As an example, referring to FIG. 10, in some scenarios a software application may have been determined as requiring an update or modification in order to operate or perform as expected following the OS upgrade (e.g., see second software 420 in FIG. 4), but no such update was available. For example, a software developer may have initially offered the update only through other channels (e.g., a direct download from the developer's site) or the update only accessible via a format that was not consistent with the automated process.

Figure 10:
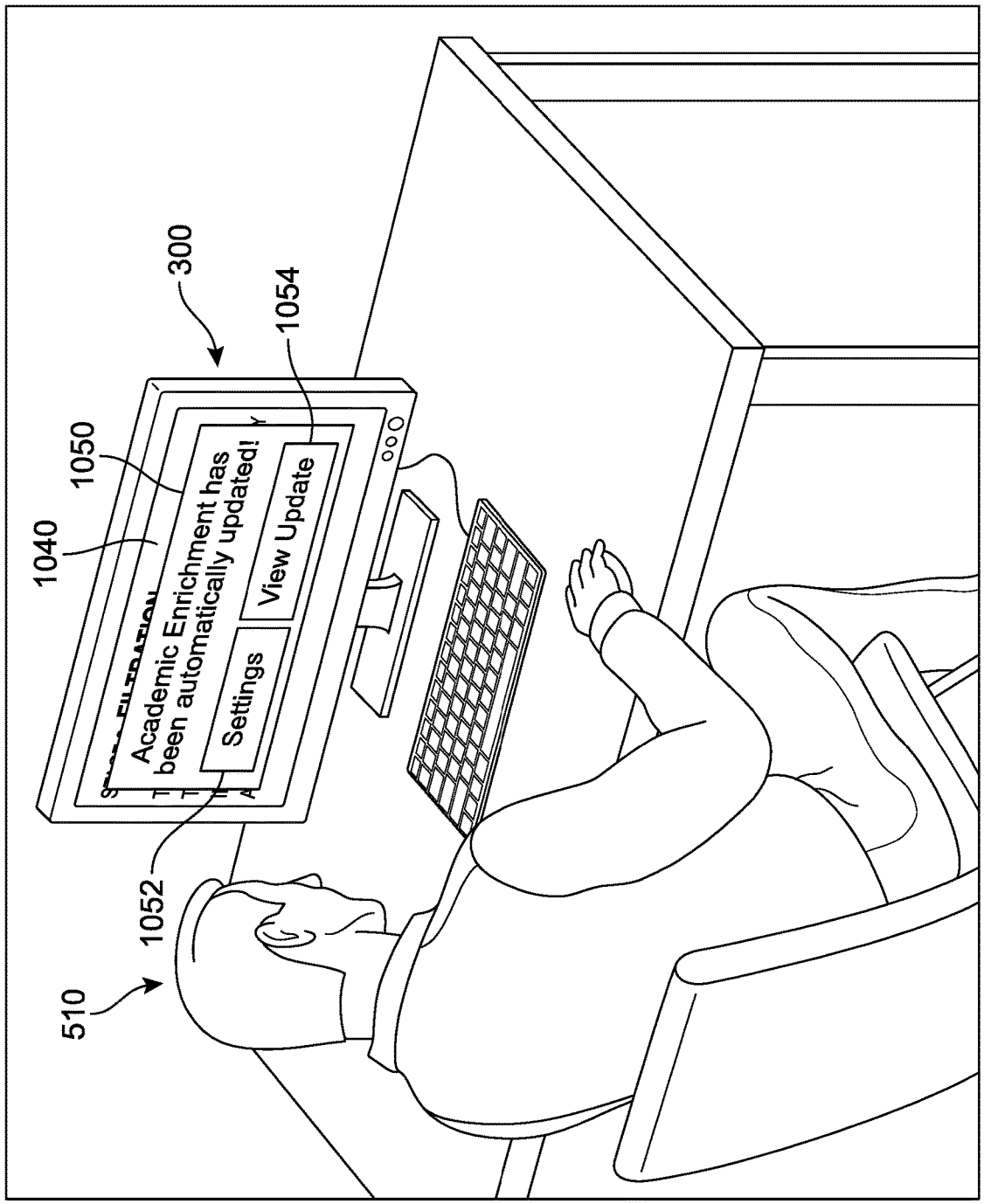
FIG. 10 is a representation of a device display with an implementation of a notification of the occurrence of a delayed software update.

In some implementations, the system may continue to query the online store for some pre-selected duration of time after the OS upgrade has occurred (or an indefinite period) to 'check' whether any updates have been added to the online store for the target software. Such queries can occur daily, weekly, monthly, or at any other interval selected by the user. In the event that the 'missing' update has now been made available through the online store, the system can, in some implementations, proceed to automatically download and install the now-available update. This can occur in the background, while the user continues working on client device 300. In FIG. 10, the user 510 is accessing an application 1040 at a time subsequent to the OS upgrade and the corresponding automated software update process. In other words, all updates that were available at the time of the OS upgrade have already been deployed, and the user 510 is simply working normally. Following a series of automated queries, the system may receive information or otherwise determine that the remaining update(s) is available. In response, an automated download can be configured to immediately occur in cases where the user has opted-in to such a mechanism. In another implementation, the system can message the user and request authorization to automatically download and install the missing update. As shown in FIG. 10 via an optional message 1050, the software "Academic Enrichment has been automatically updated!". In some implementations, the message 1050 can also offer the user one or more selectable options or links, or otherwise provide guidance or suggestions as to how the user may obtain additional or more detailed information. For example, the message 1050 includes a first selectable option 1052 for accessing or viewing settings or preferences related to such delayed updates ("Settings") as well as a second selectable option 1054 for viewing further details ("View update") for this particular update. In one implementation, this regular querying by the system can continue until the user manually locates and downloads the software update and the software is no longer out-of-date with respect to the OS upgrade, the software is removed from the client device, or the user opts-out of the service.

Figure 11:
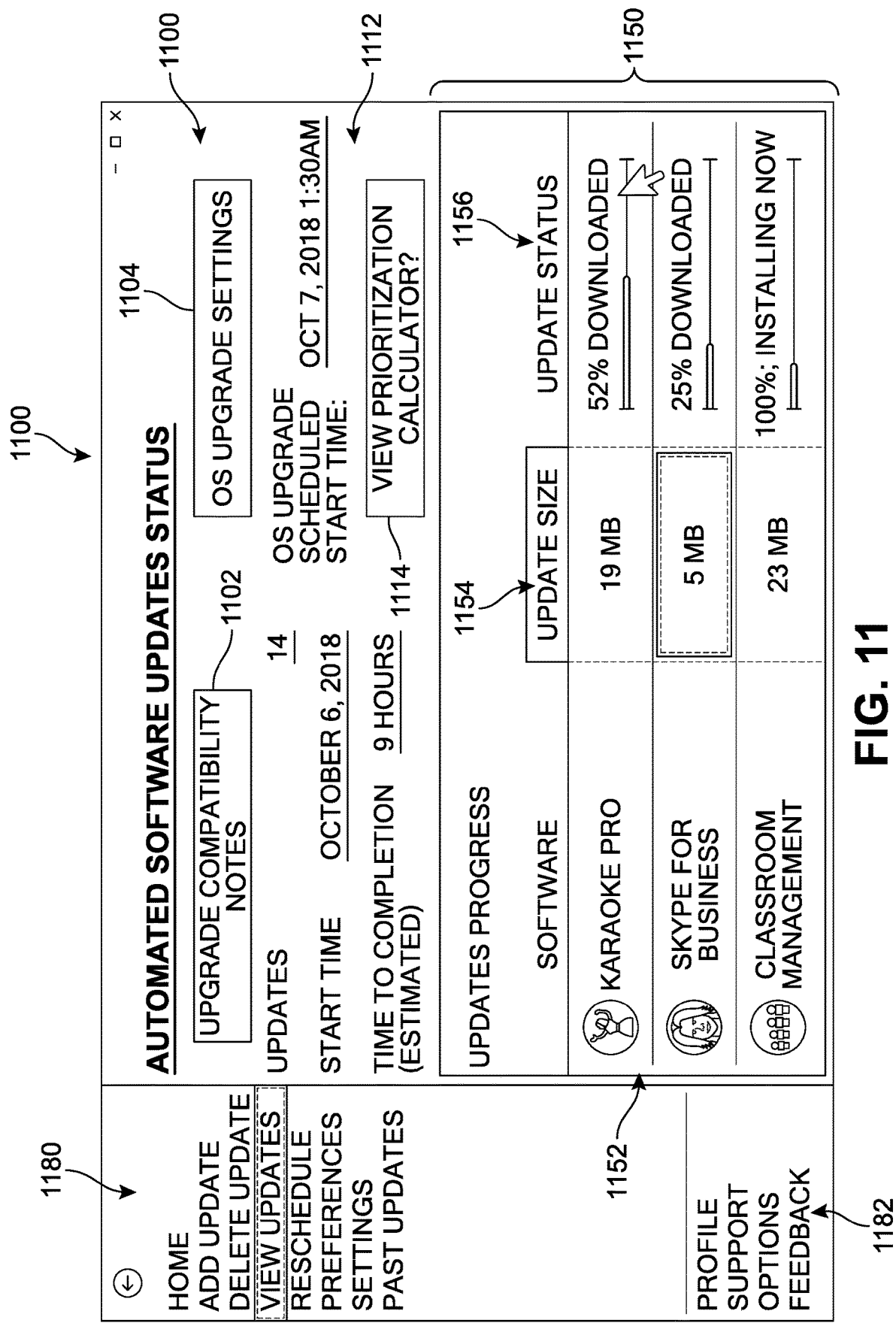
FIG. 11 is an example of a user interface for monitoring automated software updates of a user device.

Another example by which a user may more directly participate or monitor the automated update process is presented with reference to FIG. 11. In some implementations, a user may be able to view or monitor information about the updates, and/or options or tools that can be used in association with the automated updates process or software affected by the process. Referring to FIG. 11, a simplified view of an implementation of a device display 1100 is presented showing one implementation of such an interface. A first region 1110 of the interface includes a topic header "Automated Software Updates Status". In some implementations, the first region 1110 can be positioned or located adjacent or proximate to a second region 1180, or may simply appear in isolation as a pop-up window. The first region 1110 and/or second region 1180 can be configured to display or present various options by which a user may navigate through the information.

For example, in FIG. 11, a user may choose to return to a main "home" menu, add updates to the queue, delete updates from the queue, view all of the updates, reschedule the updates session and/or upgrade event, access preferences and settings for the updates, and/or view previous updates. Similarly, a general menu 1182 (here located near a lower portion of the interface) also allows the user to access profile settings and information, request help or support, generalized options, and/or submit feedback.

As noted earlier, the system can include provisions for notifying or communicating to a user the various software programs being updated during this process. A main menu 1112 is provided here, including a quick-view of the number of updates that are scheduled, the start time for the update process, the time remaining for the updates to complete, as well as information about the event that triggered the automated update process (here, the OS upgrade event). In some implementations, additional selectable options can be offered, including access to details for the upgrade event and its affect on the system software (first selectable option 1102 "Upgrade compatibility notes"), general upgrade information and settings (second selectable option 1104 "OS upgrade settings"), and a third selectable option 1114 by which the user can view how each software item was classified with respect to priority ("View prioritization calculator"), and access to options for adjusting the prioritization classification currently applied.

In one implementation, this information can be shown in order of the software's priority in the queue, the time left for the update to achieve full deployment, or the software can be otherwise sorted by alphabetical order, size of update, total update time, and/or a user designated sort. In some implementations, the interface 300 is configured to display or present a listing 1150. While the actual details of the graphical user interface and the different options can vary widely, the listing 1150 can be generally understood as a presentation of names or other identifiers 1152 for one or more of the software programs that have been included in the auto-update process, as well as some type of representation of the extent to which their update has been downloaded ("Update Status" 1156) as well as an approximation of an update size 1154. For purposes of simplicity, the examples herein illustrate the listing with a line bar, but other depictions or representations can be used, including a pie chart, bar graph, percentage, fraction, color coding of each name, size or formatting of text for each name, or other display means that can indicate the download status. In addition, further updates may be viewed by scrolling down in this example.

Figure 12A:
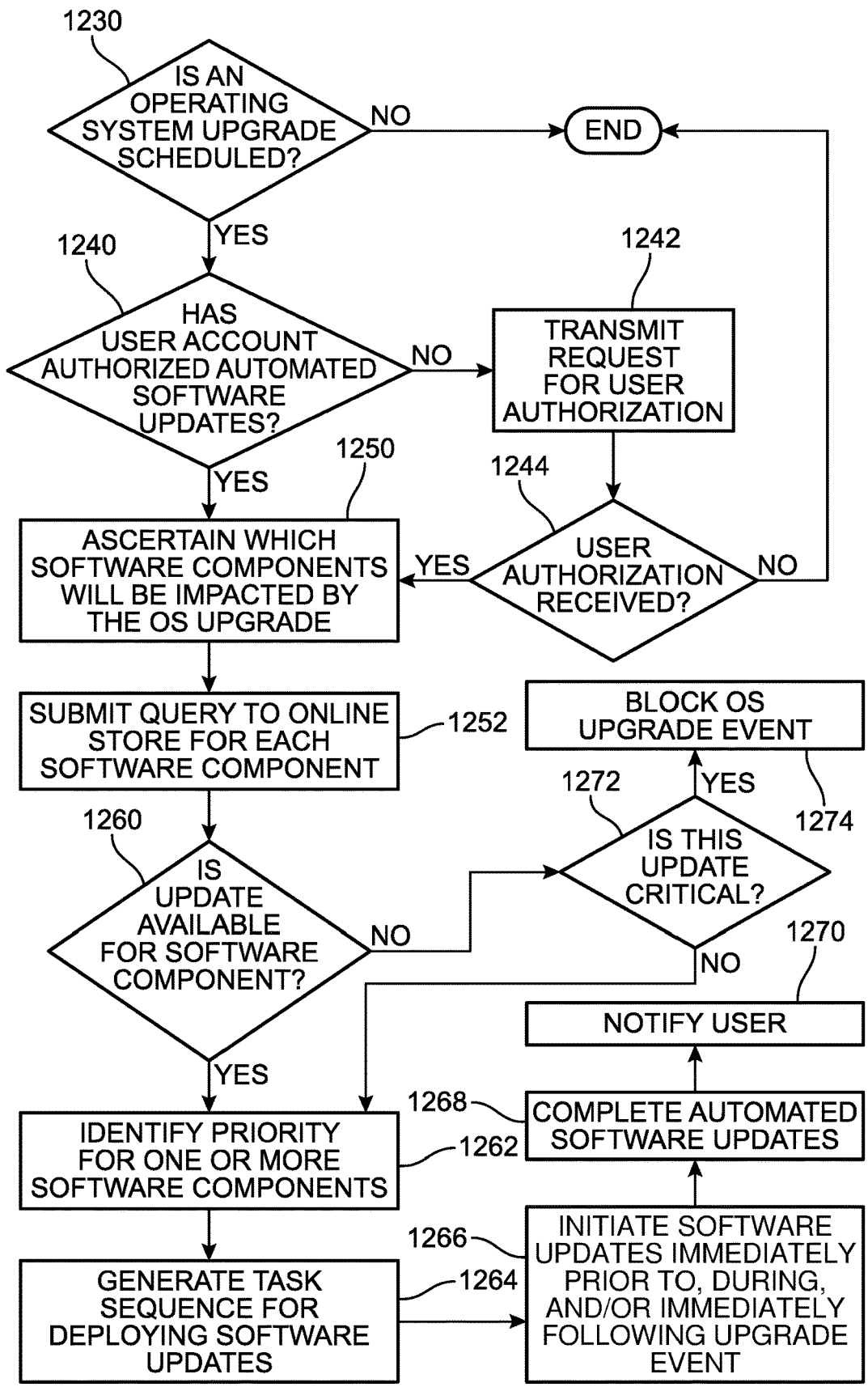
FIG. 12A is a flow diagram presenting an implementation of an automatic software update process

For purposes of clarity, FIG. 12A illustrates one implementation of a process for providing automated software updates to a local client device in conjunction with an OS upgrade event (e.g., via a remote cloud service). In this example, a first stage 1230 includes obtaining information or otherwise establishing that an upgrade for an operating system of a computing device is scheduled. In a second stage 1240, the system can ascertain whether the user account associated with this upgrade has authorized an automated software update process. If authorization is not available ("No"), a request may be transmitted to obtain user authorization in a third stage 1242. In some implementations, the request may also include information regarding the update process for the user's review. If no authorization is received at a fourth stage 1244 ("No") the process may end or return to initiate at the start of another upgrade event. However, if the user provides his or her authorization at the fourth stage 1244 ("Yes"), or if the authorization was already available following the second stage 1240, the process can continue in a fifth stage 1250, where the service determines whether the computing device includes any software component or instance that would be incompatible with or otherwise impacted by the upcoming OS upgrade to the extent that the software may not perform as expected. For each software instance identified, the system can submit a query to an online software repository or store in a sixth stage 1252.

In a seventh stage 1260, the system can ascertain whether there is an update available corresponding to each software instance that will resolve the incompatibility. If the update is not available ("No"), queries for the remaining software components may continue to be submitted to the online store. It should be understood that in some implementations, all updates found for software on the client device at the time of the OS upgrade event can be queued for automatic updates, whether that software is associated with an incompatibility. In FIG. 12A, if an update is not available, the system can proceed with a further inquiry 1272 to determine whether the missing update is critical or required. A critical update is an update for a software that, if not applied prior to the transition to the upgraded OS, will either immediately or sometime after the OS upgrade, fail, cease some aspect of functionality, or perform in a way is damaging to the client device's operations. If the update is determined to be critical, then the missing update can trigger a blocking mechanism 1274, whereby the OS upgrade process is discontinued until the specified update has been located or provided, or until there is an intervention by a user. In some implementations, the system can be configured to automatically notify the user that a required update is not available to facilitate this intervention. If the update is not critical ("No"), and no update is available at this time, the process can continue in an eighth stage 1262, and attempt(s) to update the software can be made at a later time.

The software components for which updates are available can be assigned a priority identification or classification in the eighth stage 1262, and a task sequence can be generated for deploying the updates in a ninth stage 1264. An update schedule can be created based on this information based in part on various estimates and device settings. The software updates can be downloaded and installed on the computing device shortly before, during, and shortly following the upgrade event in a tenth stage 1266. The process is complete when the designated updates have all been deployed, as shown by an eleventh stage 1268. In some implementations, the user can be notified regarding the software updates in a twelfth stage 1270.

Figure 12B:
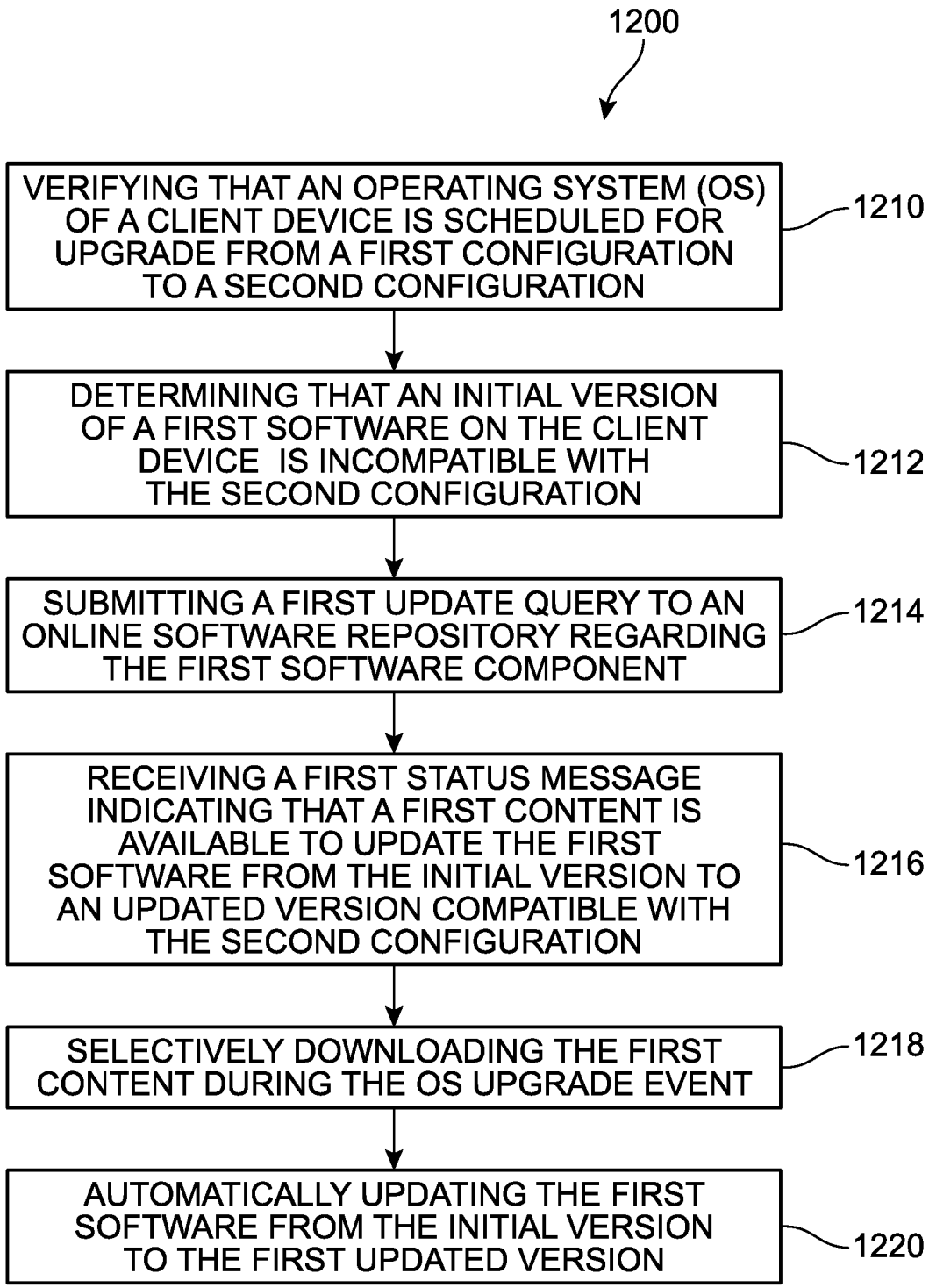
FIG. 12B is a flow chart presenting an implementation of an automatic software update method.

FIG. 12B is a flow chart illustrating an implementation of a method 1200 of automatically updating software on a client device in response to an OS upgrade or the scheduling of an OS upgrade. In the example of FIG. 12, a first step 1210 includes verifying, at a remote cloud service, that an operating system of the computing device is scheduled for upgrade from a first configuration to a second configuration via a first upgrade package during an upcoming first upgrade event. A second step 1212 includes determining that an initial version of a first software component currently stored on the computing device is incompatible with the second configuration. In addition, a third step 1214 includes submitting a first update query to an online software repository regarding the first software component, and a fourth step 1216 includes receiving, from the online software repository, a first status indicating that a first content is available to update the first software component from the initial version to a first updated version. In this case, the first updated version is compatible with the second configuration. A fifth step 1218 includes selectively downloading the first content from the online software repository to the computing device during the first upgrade event, and a sixth step 1220 includes automatically updating the first software component from the initial version to the first updated version during the first upgrade event.

In other implementations, additional steps may be included. For example, where a plurality of software components are stored on the computing device, the method can further includes steps of determining that an initial version of a second software component currently stored on the computing device is incompatible with the second configuration, submitting a second update query to the online software repository regarding the second software component, receiving, from the online software repository, a second status indicating that a second content is available to update the second software component from the initial version to a first updated version, wherein the first updated version is compatible with the second configuration, selectively downloading the second content from the online software repository to the computing device prior to or during the first upgrade event, and/or automatically updating the second software component from the initial version to the first updated version during the first upgrade event.

In some implementations, the method may also comprise determining that an initial version of a second software component currently stored on the computing device is incompatible with the second configuration, submitting a second update query to the online software repository regarding the second software component, receiving, from the online software repository, a second status indicating that content configured to update the second software component is currently unavailable, and transmitting a message to the client computing device for informing a user that the initial version of the second software component is incompatible with the second configuration.

As another example, the method may further include verifying, at the remote cloud service, that the operating system of the computing device is scheduled for upgrade from the second configuration to a third configuration via a second upgrade package during an upcoming second upgrade event, determining that the first updated version of the first software component is compatible with the third configuration, and maintaining the first updated version of the first software component as a current version of the first software component following the second upgrade event, or otherwise refraining from requesting an update for the first software component with respect to the second upgrade event.

In one implementation, the method can also include verifying, at the remote cloud service, that the operating system of the computing device is scheduled for upgrade from the third configuration to a fourth configuration via a third upgrade package during an upcoming third upgrade event, determining that the updated version of the first software component is incompatible with the fourth configuration, submitting a second update query to the online software repository regarding the first software component, receiving, from the online software repository, a second status indicating that a second content is available to update the first software component from the first updated version to a second updated version, where the second updated version is compatible with the fourth configuration, selectively downloading the second content from the online software repository to the computing device prior to or during the third upgrade event, and automatically updating the second software component from the first updated version to the second updated version during the third upgrade event.

In addition, as another example, the method can involve receiving, at the remote cloud service, from a user account associated with the computing device, authorization to enable automated software updates during operating system upgrade events. In some implementations, the method further includes prioritizing the first software component over the second software component and thereby downloading the first content prior to the second content. In another implementation, the method includes steps of classifying the second software component as having a higher priority than the first software component, downloading the second content prior to an initiation or commencement of the first upgrade event, and downloading the first content during the first upgrade event.

As another example, the method may also involve determining that an initial version of a third software component currently stored on the computing device is incompatible with the second configuration, submitting a third update query to the online software repository regarding the third software component, receiving, from the online software repository, a third status indicating that a third content is available to update the third software component from the initial version to a first updated version, wherein the first updated version is compatible with the second configuration, classifying the third software component as having a lower priority than the first software component, selectively downloading the third content from the online software repository to the computing device during or after the first upgrade event, and automatically updating the third software component from the initial version to the first updated version after the operating system has been upgraded to the second configuration.

In addition, in some implementations, the download of the first content occurs concurrently with a download of the first upgrade package and/or in a process parallel to the upgrade event process. In another example, the first content includes an .MSIX modification package and/or is of an MSIX format type. In some implementations, an interface can be provided, via the computing device, for managing the task sequence such that a plurality of updates for software components may be ordered. Similarly, in one implementation, the method can include presentation of an interface by which a user may monitor the status of the plurality of updates. In another example, an interface can be provided by which a user can customize or otherwise identify preferences by which the downloading of any updates should be prioritized, and/or whether any updates should be excluded from the process.

It should be understood that in many cases the systems and methods described herein will make use of and/or rely on the Microsoft® MSIX packaging technology format. For example, the online store or software repository can offer and maintain software packages in an MSIX container, which can be modified during an update. In some implementations, existing MSI applications can be converted to .MSIX to facilitate the automated update process. In some implementations, the MSIX package specification can provide a unified packaging format for Win32, Desktop Bridges, and/or Universal Windows Platform (UWP) applications to deliver containerization for software applications. For example, the format utilizes an AppX application framework and provides a path to deploy software applications to the Windows Store®. Such containers are an intermediate layer between a virtualized operating system and an application where the container ensures strict isolation between the application and the operating system. However, in other implementations, the file formats for the software applications may include other file types.

It may be appreciated that, in many situations, the average user is unaware of the particular steps and modifications that have led to an OS upgrade on their device. As a result, the user may approach their device following an upgrade with expectation that the device offers at least the same level of performance as before the upgrade event. Without the automated updates process as disclosed herein the user may engage in behavior that gradually reveals the instability associated with various 'older' programs, and perhaps realize the problem only when they encounter situations that lead to data loss. In some cases, the users may exacerbate the problems during their attempts to compensate and hinder the security of their own account. Furthermore, in cases where the user becomes aware of a problem, he or she may attempt to initiate an update process but struggle with the manual steps required to successfully download and install the correct updates. Oftentimes, the user may initiate or complete some of the tasks to the extent needed to continue working normally, but remain unaware of other applications that remain incompatible on their device.

As noted previously, the ability to provide users a mechanism by which to better manage device updates can significantly improve workflow efficiency and enhance the user experience. By responding to scheduled OS upgrade events by an automated update process as described herein, users can have peace of mind in their everyday computing use. Through the use of this system, users can continue to reliably access and maintain the most recent secured versions of their software in the face of multiple OS upgrades over the lifetime of their computing device. In addition, by providing users with notifications following these automated processes, users are given an opportunity to remain abreast of the status of their software, and even modify the approach with which such updates are performed. This type of mechanism can help a user feel more confident, and/or reduce the possibility of their experiencing system instability. Because the process occurs concurrently with the OS upgrade, where the user is already expecting or accustomed to changes or downtime in the system, the overall process is less intrusive than standard software update processes.

The detailed examples of systems, devices, and techniques described in connection with FIGS. 1-12 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-12 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 13:
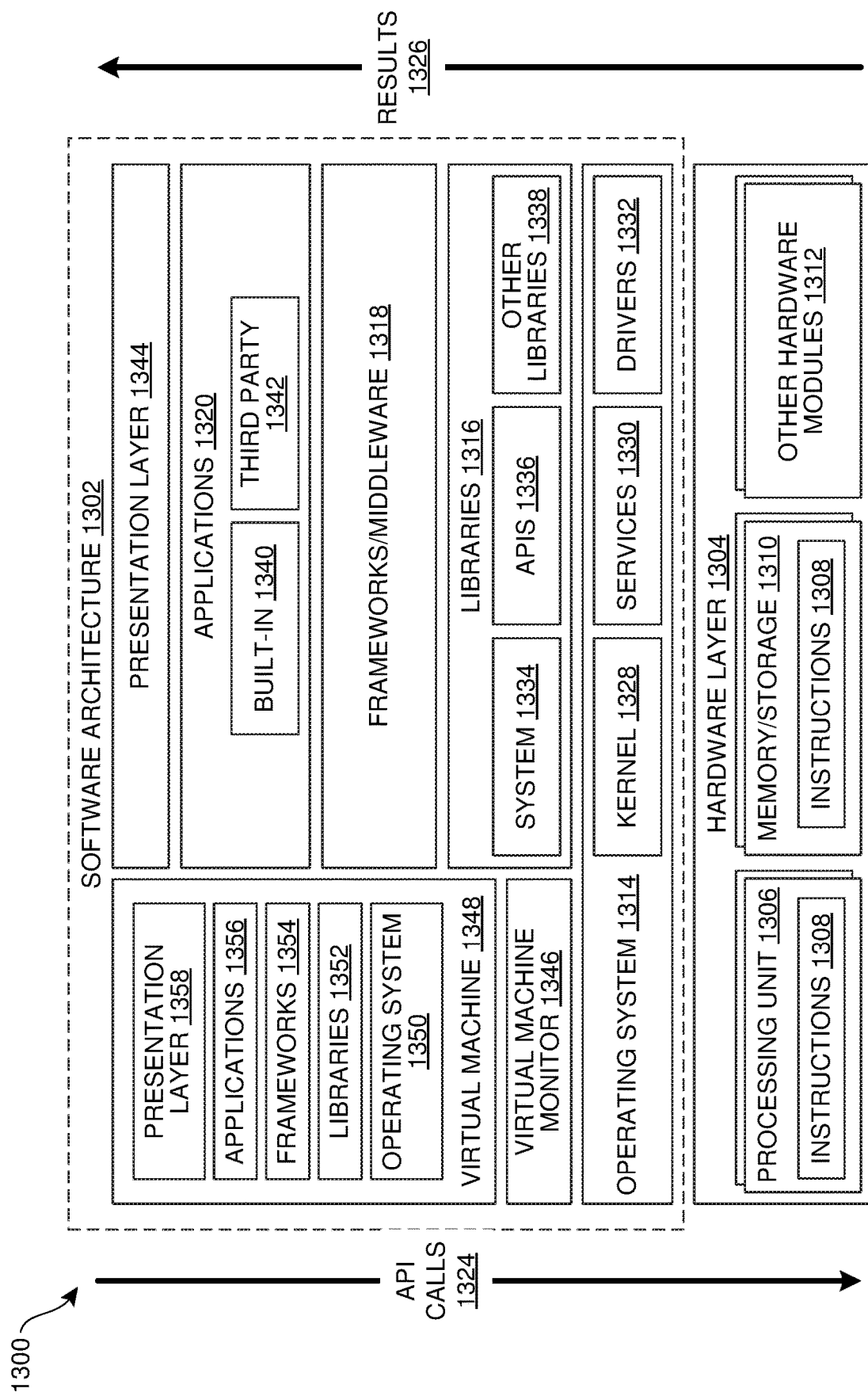
FIG. 13 is a block diagram of an example computing device, which may be used to provide implementations of the mechanisms described herein.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware that includes, among other things, document storage, processors, memory, and input/ output (I/O) components. A representative hardware layer 1304 is illustrated and can represent, a computing device. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers. For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1318 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1348. The virtual machine 1348 provides an execution environment where applications/modules can execute as if they were executing on a hardware machine (such as the machine 1000 of FIG. 10, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1302 outside of the virtual machine, executes within the virtual machine 1348 such as an OS 1350, libraries 1352, frameworks 1354, applications 1356, and/or a presentation layer 1358.

Figure 14:
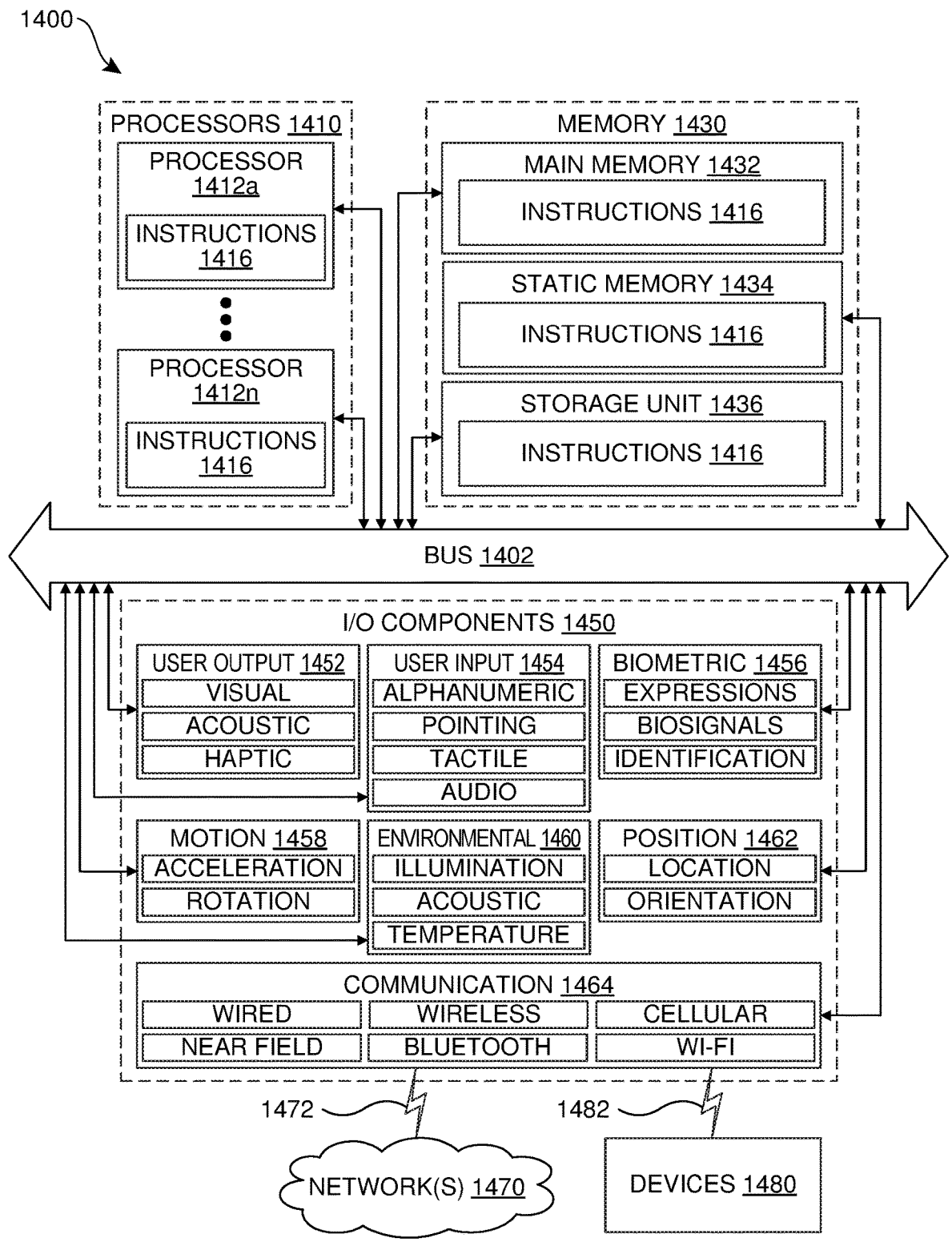
FIG. 14 is a block diagram illustrating components of an example machine configured to read instructions from a machine-readable medium.

FIG. 14 is a block diagram illustrating components of an example machine 1400 configured to read instructions from a machine-readable medium (for example, a machine-readable storage medium) and perform any of the features described herein. It is to be understood that the phrase "machine-readable medium" and "computer-readable medium" are interchangeable in their usage herein. The example machine 1400 is in a form of a computer system, within which instructions 1416 (for example, in the form of software components) for causing the machine 1400 to perform any of the features described herein may be executed. As such, the instructions 1416 may be used to implement modules or components described herein. The instructions 1416 cause unprogrammed and/or unconfigured machine 1400 to operate as a particular machine configured to carry out the described features. The machine 1400 may be configured to operate as a standalone device or may be coupled (for example, networked) to other machines. In a networked deployment, the machine 1400 may operate in the capacity of a server machine or a client machine in a server-client network environment, or as a node in a peer-to-peer or distributed network environment. Machine 1400 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1400 is illustrated, the term "machine" includes a collection of machines that individually or jointly execute the instructions 1416.

The machine 1400 may include processors 1410, memory 1430, and I/O components 1450, which may be communicatively coupled via, for example, a bus 1402. The bus 1402 may include multiple buses coupling various elements of machine 1400 via various bus technologies and protocols. In an example, the processors 1410 (including, for example, a central processing unit (CPU), a graphics processing unit (GPU), a digital signal processor (DSP), an ASIC, or a suitable combination thereof) may include one or more processors 1412a to 1412n that may execute the instructions 1416 and process data. In some examples, one or more processors 1410 may execute instructions provided or identified by one or more other processors 1410. The term "processor" includes a multi-core processor including cores that may execute instructions contemporaneously. Although FIG. 14 shows multiple processors, the machine 1400 may include a single processor with a single core, a single processor with multiple cores (for example, a multi-core processor), multiple processors each with a single core, multiple processors each with multiple cores, or any combination thereof. In some examples, the machine 1400 may include multiple processors distributed among multiple machines.

The memory/storage 1430 may include a main memory 1432, a static memory 1434, or other memory, and a storage unit 1436, both accessible to the processors 1410 such as via the bus 1402. The storage unit 1436 and memory 1432, 1434 store instructions 1416 embodying any one or more of the functions described herein. The memory/storage 1430 may also store temporary, intermediate, and/or long-term data for processors 1410. The instructions 1416 may also reside, completely or partially, within the memory 1432, 1434, within the storage unit 1436, within at least one of the processors 1410 (for example, within a command buffer or cache memory), within memory at least one of I/O components 1450, or any suitable combination thereof, during execution thereof. Accordingly, the memory 1432, 1434, the storage unit 1436, memory in processors 1410, and memory in I/O components 1450 are examples of machine-readable medium.

As used herein, "machine-readable medium" refers to a device able to temporarily or permanently store instructions and data that cause machine 1400 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1416) for execution by a machine 1400 such that the instructions, when executed by one or more processors 1410 of the machine 1400, cause the machine 1400 to perform and one or more of the features described herein. Accordingly, a "machine-readable medium" may refer to a single storage device, as well as "cloud-based" storage systems or storage networks that include multiple storage apparatus or devices.

The I/O components 1450 may include a wide variety of hardware components adapted to receive input, provide output, produce output, transmit information, exchange information, capture measurements, and so on. The specific I/O components 1450 included in a particular machine will depend on the type and/or function of the machine. For example, mobile devices such as mobile phones may include a touch input device, whereas a headless server or IoT device may not include such a touch input device. The particular examples of I/O components illustrated in FIG. 14 are in no way limiting, and other types of components may be included in machine 1400. The grouping of I/O components 1450 are merely for simplifying this discussion, and the grouping is in no way limiting. In various examples, the I/O components 1450 may include user output components 1452 and user input components 1454. User output components 1452 may include, for example, display components for displaying information (for example, a liquid crystal display (LCD) or a projector), acoustic components (for example, speakers), haptic components (for example, a vibratory motor or force-feedback device), and/or other signal generators. User input components 1454 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1450 may include biometric components 1456 and/or position components 1462, among a wide array of other environmental sensor components. The biometric components 1456 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1462 may include, for example, location sensors (for example, a Global Position System (GPS) receiver), altitude sensors (for example, an air pressure sensor from which altitude may be derived), and/or orientation sensors (for example, magnetometers).

The I/O components 1450 may include communication components 1464, implementing a wide variety of technologies operable to couple the machine 1400 to network(s) 1470 and/or device(s) 1480 via respective communicative couplings 1472 and 1482. The communication components 1464 may include one or more network interface components or other suitable devices to interface with the network(s) 1470. The communication components 1464 may include, for example, components adapted to provide wired communication, wireless communication, cellular communication, Near Field Communication (NFC), Bluetooth communication, Wi-Fi, and/or communication via other modalities. The device(s) 1480 may include other machines or various peripheral devices (for example, coupled via USB).

In some examples, the communication components 1464 may detect identifiers or include components adapted to detect identifiers. For example, the communication components 1464 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1462, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 7,987,459 to Chow et al., granted Jul. 26, 2011 and titled "Application programming interface for identifying, downloading and installing applicable software updates"; U.S. Pat. No. 8,701,102 to Appiah et al., granted Apr. 15, 2014 and titled "Techniques for automatic software provisioning"; U.S. Pat. No. 7,676,448 to Henderson et al., granted Mar. 9, 2010 and titled "Controlling installation update behaviors on a client computer"; U.S. Pat. No. 9,645,809 to Cohen et al., granted May 9, 2017 and titled "Updating software components through online stores"; U.S. Patent Publication Number 2011/0289499 to Haubold et al., published Nov. 24, 2011 and titled "Techniques to automatically update software applications"; U.S. Patent Publication Number 2012/0130725 to Cooper et al., published May 24, 2012 and titled "Automatic upgrade scheduling"; and U.S. Patent Publication Number 2016/0117161 to Parthasarathy et al., published Apr. 28, 2016 and titled "Installing and updating software systems"; the disclosures of which are each herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An automated software update system for updating software components stored at a computing device, the system comprising:

a processor; and computer readable media including instructions which, when executed by the processor, cause the processor to:

determine that an initial version of a first client software application currently stored on the computing device is compatible with a first configuration of an operating system of the computing device, but is incompatible with a second configuration of the operating system, the first client software application being separate from the operating system, the operating system being upgraded from the first configuration to the second configuration during an upcoming first upgrade event;

submit a first update query regarding the first client software application;

receive, in response to the first update query a first status indicating that a first content is available to update the first client software application from the initial version to an updated version, wherein the updated version is compatible with the second configuration of the operating system; and automatically update the first client software application from the initial version to the updated version prior to the first upgrade event that upgrades the operating system from the first configuration to the second configuration;

wherein the updating of the first client software application prior to the first upgrade event is based on a priority of the first client software application.

2. The system of claim 1, wherein the instructions further cause the processor to:

determine that an initial version of a second client software application currently stored on the computing device is incompatible with the second configuration of the operating system;

receive a second status indicating that a second content is available to update the second client software application from the initial version to an updated version, wherein the updated version is compatible with the second configuration of the operating system; and automatically update the second client software application from the initial version to the updated version during the first upgrade event.

3. The system of claim 2, wherein the instructions further cause the processor to:

classify the first client software application as having a higher priority than the second client software application;

download the first content prior to commencement of the first upgrade event; and download the second content during the first upgrade event.

4. The system of claim 3, wherein the instructions further cause the processor to:

determine that an initial version of a third client software application currently stored on the computing device is incompatible with the second configuration of the operating system;

receive a third status indicating that a third content is available to update the third client software application from the initial version to an updated version, wherein the updated version is compatible with the second configuration of the operating system; and automatically update the third client software application from the initial version to the updated version after the first upgrade event.

5. The system of claim 4, wherein the instructions further cause the processor to:

classify the third client software application as having a lower priority than either the first client software application or the second client software application; and download the third content after the first upgrade event.

6. The system of claim 1, wherein the instructions further cause the processor to:

determine that an initial version of a second client software application currently stored on the computing device is incompatible with the second configuration of the operating system;

receive a second status indicating that content configured to update the second client software application is currently unavailable; and in response to receiving the second status, for inform a user that the initial version of the second client software application is incompatible with the second configuration of the operating system.

7. The system of claim 1, wherein the instructions further cause the processor to receive from a user account associated with the computing device, authorization to enable automated client software application updates during operating system upgrade events.

8. The system of claim 1, wherein the download of the first content occurs concurrently with a download of at least a portion of a first upgrade package utilized to upgrade the operating system from the first configuration to the second configuration during the first upgrade event.

9. A method for updating software components stored at a computing device, the method comprising:

determining that an initial version of a first client software application currently stored on the computing device is compatible with a first configuration of an operating system of the computing device, but is incompatible with a second configuration of the operating system, the first client software application being separate from the operating system, the operating system being upgraded from the first configuration to the second configuration during an upcoming first upgrade event;

submitting a first update query regarding the first client software application;

receiving, in response to the first update query, a first status indicating that a first content is available to update the first client software application from the initial version to an updated version, wherein the updated version is compatible with the second configuration of the operating system; and automatically updating the first client software application from the initial version to the updated version prior to the first upgrade event that upgrades the operating system from the first configuration to the second configuration;

wherein the updating of the first client software application prior to the first upgrade event is based on a priority of the first client software application.

10. The method of claim 9, further comprising:

determining that an initial version of a second client software application currently stored on the computing device is incompatible with the second configuration of the operating system;

receiving a second status indicating that a second content is available to update the second client software application from the initial version to an updated version, wherein the updated version is compatible with the second configuration of the operating system; and automatically updating the second client software application from the initial version to the updated version during the first upgrade event.

11. The method of claim 10, further comprising:

classifying the first client software application as having a higher priority than the second client software application;

downloading the first content prior to an initiation of the first upgrade event; and downloading the second content during the first upgrade event.

12. The method of claim 11, further comprising:

determining that an initial version of a third client software application currently stored on the computing device is incompatible with the second configuration of the operating system;

receiving a third status indicating that a third content is available to update the third client software application from the initial version to an updated version, wherein the first updated version is compatible with the second configuration of the operating system; and automatically updating the third client software application from the initial version to the updated version after the first upgrade event.

13. The method of claim 12, further comprising:
classifying the third client software application as having a lower priority than either the first client software application or the second client software application; and
downloading the third content after the first upgrade event.

14. The method of claim 11, wherein the downloading of the second content is delayed to occur during the first upgrade event based on the second client having a lower priority.

15. The method of claim 9, further comprising:
determining that an initial version of a second client software application currently stored on the computing device is incompatible with the second configuration of the operating system;
receiving, a second status indicating that content configured to update the second client software application is currently unavailable; and
in response to receiving the second status, informing a user that the initial version of the second client software application is incompatible with the second configuration of the operating system.

16. The method of claim 9, further comprising receiving, from a user account associated with the computing device, authorization to enable automated client software application updates during operating system upgrade events.

17. A computer readable medium including instructions stored therein which, when executed by a processor, cause the processor to perform operations comprising:
determine that an initial version of a first client software application currently stored on a computing device is compatible with a first configuration of an operating system of the computing device, but is incompatible with a second configuration of the operating system, the first client software application being separate from the operating system, the operating system being upgraded from the first configuration to the second configuration during an upcoming first upgrade event;
submit a first update query regarding the first client software application;
receive, in response to the first update query, a first status indicating that a first content is available to update the first client software application from the initial version to an updated version, wherein the updated version is compatible with the second configuration of the operating system; and
automatically update the first client software application from the initial version to the updated version prior to the first upgrade event that upgrades the operating system from the first configuration to the second configuration;
wherein the updating of the first client software application prior to the first upgrade event is based on a priority of the first client software application.

18. The system of claim 3, wherein the downloading of the second content is delayed to occur during the first upgrade event based on the second client having a lower priority.

19. The computer readable medium of claim 17, including further instructions stored thereon which, when executed by the processor, cause the processor to perform operations comprising:
determine that an initial version of a second client software application currently stored on the computing device is incompatible with the second configuration of the operating system;
receive a second status indicating that a second content is available to update the second client software application from the initial version to an updated version, wherein the updated version is compatible with the second configuration of the operating system; and
automatically update the second client software application from the initial version to the updated version during the first upgrade event.

20. The computer readable medium of claim 19, including further instructions stored thereon which, when executed by the processor, cause the processor to perform operations comprising:
classify the first client software application as having a higher priority than the second client software application;
download the first content prior to commencement of the first upgrade event; and
download the second content during the first upgrade event.

* * * * *